(12) United States Patent
Takada et al.

(10) Patent No.: US 6,200,707 B1
(45) Date of Patent: Mar. 13, 2001

(54) SOLID ELECTROLYTIC MOLDINGS, ELECTRODE MOLDINGS, AND ELECTROCHEMICAL ELEMENTS INCLUDING A POLYBUTADIENE BLOCK COPOLYMER

(75) Inventors: Kazunori Takada, Osaka; Kazuya Iwamoto, Sakai; Shigeo Kondo, Hirakata; Naoshi Yasuda, Tsuchiura; Fusazumi Masaka, Tsukuba; Yasumasa Takeuchi, Yokohama, all of (JP)

(73) Assignees: Matsushita Electric Industrial Co., Ltd., Osaka; JSR Corporation, Tokyo, both of (JP)

( * ) Notice: Subject to any disclaimer, the term of this patent is extended or adjusted under 35 U.S.C. 154(b) by 0 days.

(21) Appl. No.: 09/297,478
(22) PCT Filed: Aug. 31, 1998
(86) PCT No.: PCT/JP98/03912
§ 371 Date: Apr. 30, 1999
§ 102(e) Date: Apr. 30, 1999
(87) PCT Pub. No.: WO99/12221
PCT Pub. Date: Mar. 11, 1999

(30) Foreign Application Priority Data

Sep. 3, 1997 (JP) .................................................. 9-238705

(51) Int. Cl.⁷ .............................. H01M 6/18; H01M 4/60; H01M 10/08
(52) U.S. Cl. ........................... 429/304; 429/306; 429/309; 429/212
(58) Field of Search .................................. 429/304, 191, 429/217, 306, 309, 212

(56) References Cited

U.S. PATENT DOCUMENTS

| | | | |
|---|---|---|---|
| 4,828,945 | * 5/1989 | Nagata | 429/191 |
| 5,262,255 | * 11/1993 | Ito | 429/217 |
| 5,395,870 | * 3/1995 | Suzuki | 524/136 |
| 5,409,785 | * 4/1995 | Nakano | 429/33 |

* cited by examiner

Primary Examiner—Carol Chaney
Assistant Examiner—Mark Ruthkosky
(74) Attorney, Agent, or Firm—Akin, Gump, Strauss, Hauer & Feld, L.L.P.

(57) ABSTRACT

Disclosed are a molded solid electrolyte and molded electrode having excellent electrochemical properties and high procesability. As a binder for these molded articles, a hydrogenated block copolymer is used which is obtained by hydrogenating a straight chain or branched block copolymer containing a block (A) comprising polybutadiene whose 1,2-vinyl bond content is 15% or less and a block (B) comprising a butadiene (co)polymer consisting of 50 to 100% by weight of butadiene and 0 to 50% by weight of other monomers in which 1,2-vinyl bond content of butadiene portion is 20 to 90%, wherein (A)/(B)=5 to 70/95 to 30% by weight.

13 Claims, 5 Drawing Sheets

SOLID ELECTROLYTIC MOLDINGS, ELECTRODE MOLDINGS, AND ELECTROCHEMICAL ELEMENTS INCLUDING A POLYBUTADIENE BLOCK COPOLYMER

TECHNICAL FIELD

The present invention relates to electrochemical devices, and molded solid electrolytes and molded electrodes used in the electrochemical devices. More particularly, the present invention relates to molded articles holding therein an electrolyte material and electrode material by adding a polymer compound to these electrochemical device constituting materials, and an electrochemical device fabricated using these molded articles.

BACKGROUND ART

Electrochemical devices such as battery cells comprise an electrolyte layer where ion transfer takes place and an electrode layer where electron transfers to ions takes place together with the ion transfer. Polymer compounds are added to the electrolyte layer and electrode layer for the following purposes.

1) Addition to the Electrolyte Layer

Since electrolytes are usually liquid with a supporting salt dissolved in a solvent, and hence require a container for containing the liquid, electrochemical devices using such electrolytes are difficult to make smaller and thinner. To solve this problem, researches are being conducted on all-solid state electrochemical devices using solid electrolytes in place of traditional liquid electrolytes.

Among others, lithium batteries have been researched vigorously as the type of battery that can obtain high energy density since lithium is a substance with a light atomic weight and large ionization energy, and nowadays, lithium batteries are extensively used as power sources for portable appliances.

On the other hand, with the widespread use of lithium batteries, concern has been growing in recent years about the safety of batteries because of increased internal energy associated with the increase in the amount of active material content and also because of increasing amounts of organic solvents which are flammable materials used as electrolytes.

As a method to ensure the safety of lithium batteries, it is extremely effective to use solid electrolytes, which are nonflammable, in place of organic solvent electrolytes. It is therefore important to use solid electrolytes for lithium batteries in order to ensure high safety levels as well as to achieve the earlier noted small and thin construction.

Materials such as lithium halide, lithium nitride, lithium oxygen acid salt, or their derivatives, are known as materials for lithium ion conductive solid electrolytes used in such batteries. Amorphous solid electrolytes of lithium ion conductive sulfides such as $Li_2S$-$SiS_2$, $Li_2S$-$P_2S_5$, $Li_2S$-$B_2S_3$, and the like, and lithium ion conductive solid electrolytes formed from such glasses doped with a lithium halide such as LiI or a lithium salt such as $Li_3PO_4$, are known to exhibit high ionic conductivity of the order of $10^{-4}$ to $10^{-3}$ S/cm or higher.

As compared with these inorganic solid electrolytes, a polymer solid electrolyte comprising an organic substance is obtained from a solution of a lithium salt and an organic polymer compound by allowing the solvent to evaporate. This polymer solid electrolyte has excellent workability compared with inorganic solid electrolytes, in that it can be easily formed into a thin film and in that the resulting solid electrolyte thin film has flexibility.

As a solid electrolyte having flexibility or rubber elasticity, there has recently been proposed a novel solid electrolyte, named the "polymer in salts" electrolyte, that comprises an inorganic salt and a polymer and has lithium ion conductivity of extremely high density compared with the above-described polymer solid electrolyte (C. A. Angell, C. Liu, and E. Sanchez, Nature, vol. 362, (1993) 137).

In electrochemical devices using liquid electrolytes also, a porous polymer compound is usually used as a separator in the electrolyte layer. The separator may mechanically prevent an electrical contact between the electrodes, and is required not only to have excellent liquid retentivity for retaining the liquid electrolyte and be chemically stable in the electrochemical device, but also to be electrochemically stable since it is used in contact with the electrodes.

2) Addition to the Electrode Layer

An electrode is formed by molding an electrode active material and contacting the same with a current collector. If the electrode active material is simply molded by a pressure molding process, the cohesive force working between electrode active material particles primarily depends only on van der Waals forces. However, since conventional electrochemical devices use liquid as the electrolyte, if the molded electrode formed by the pressure molding process alone is immersed in the liquid electrolyte, liquid molecules are adsorbed onto the surfaces of the electrode active material particles, as a result of which the cohesive force working between the active material particles decreases and active material particles drop off the molded electrode into the liquid electrolyte, resulting in that the shape of the molded electrode cannot be retained. To increase the formability of the electrode, usually a polymer compound is added as a binding agent to the molded electrode.

To the electrolyte layer or electrode layer of an electrochemical device, polymer compounds are added for the above-described purposes, but the prior art techniques have had the following problems.

The inorganic solid electrolytes described above are ceramic or glass, and in battery cell applications, the materials are usually used in the form of pellets obtained by pressure molding pulverized solid electrolyte powder. However, since the pellets are hard and brittle, there has been the problem that they lack workability and are difficult to be made thin.

The organic solid electrolytes, on the other hand, have low ionic conductivity of the order of $10^{-4}$ S/cm or less at room temperature, which has not been sufficient for practical lithium cell electrolytes. To solve this problem, it has been proposed to make a polymer solid electrolyte with increased ionic conductivity by adding a plasticizer. However, plasticizers are flammable by their nature, and the addition of a plasticizer in turn gives rise to such problems as decreased lithium ion transport number or decreased reactivity with the lithium anode. Furthermore, whether a plasticizer is added or not, it is hard to say that these organic solid electrolytes have sufficient performance as lithium battery electrolytes.

Further, most of the solid electrolytes generally known as the "polymer in salt" electrolyte have low ionic conductivity, of the order of $10^{-4}$ S/cm or less, which cannot be said to be sufficient for lithium battery electrolytes. If an ambient temperature molten salt such as $AlCl_3$-LiBr-$LiClO_4$ is used as the inorganic salt, high ionic conductivity can be obtained, but this in turn tends to cause an electrochemical reduction of aluminum and, therefore, cannot be said to be suitable for lithium cell electrolytes.

As earlier described, the molded electrode is constituted by a mixture, which is prepared by mixing a polymer compound as a binder into the electrode active material. The polymer compound is usually an electrically insulating substance and tends to interfere with the ion transfer, thus interfering with the electrochemical reaction occurring at the electrode/electrolyte interface and also the dispersion of ions within the electrode. If the mixing ratio of the polymer compound is increased to improve the formability, there arises the problem that the operating characteristics of the electrochemical device tend to drop.

Further, the molded electrode is formed by mixing in a dispersing medium a mixture comprising an electrode active material, a binder, and an electron conductive material added if necessary to increase the electron conductivity within the electrode, and by loading or coating a current collector with the resulting slurry and allowing the dispersing medium to evaporate. To enhance the coating or loading properties of the slurry, it is desirable that the polymer compound used as the binder be soluble in the dispersing medium used.

When a solid electrolyte is used as the electrolyte, particles of the electrode active material are prevented from being separated and dropping into the electrolyte. However, in that case also, if the molded electrode is formed by simply pressure molding an electrode active material, or a mixture of an electrode active material and a solid electrolyte to increase the reacting surface area, the molded electrode is hard and brittle and lacks workability, the resulting problem being difficulty in constructing the electrochemical device.

Further, when a solid electrolyte is used as the electrolyte, since the contact interface with the electrode active material is a solid/solid interface, the contact surface area between the electrode active material and the electrolyte becomes smaller than when a liquid electrolyte is used. This therefore, tends to increase the electrode reaction resistance. When an electrically insulating polymer compound is added to improve the formability, this tendency becomes more pronounced. This has therefore led to the problem that the electrode reaction speed tends to drop.

Taking the lithium battery as an example of the electrochemical device, lithiated cobalt oxide ($Li_xCoO_2$) or the like is used as the cathode active material, and graphite or the like as the anode active material. Since these materials are obtained as powder, if they are simply pressure molded into molded electrodes for use in the lithium battery, as earlier described, the liquid electrolyte penetrates between the electrode constituent particles, causing the electrodes to swell and thus resulting in the problem that not only does it become difficult to retain the shape but the electrical contact also tends to be lost.

Further, $Li_xCoO_2$ has a structure of a triangular lattice of oxygen, lithium, and cobalt stacked in the order of O, Li, O, Co, O, Li, and O, and lithium ions are accommodated between the $CoO_2$ layers. Through an electrochemical oxidation reduction reaction within the lithium ion conductive electrolyte, the lithium ions move in and out the space between the $CoO_2$ layers. As a result, the degree of electrical interaction between the $CoO_2$ layers varies, causing the layer spacing to expand and contract and hence a volumetric change of the electrode. This has lead to the problem that as charge/discharge cycles are repeated, bonds between the electrode forming particles tend to be lost and the capacity drops with charge/discharge cycles.

The above description has been given by taking $Li_xCoO_2$ as an example of the electrode active material; materials traditionally used as the lithium cell active materials or materials expected to be used in the future include transition metal oxides such as $Li_xNiO_2$, $Li_xMnO_2$, $MnO_2$ and the like, transition metal disulfides such as $Li_xTiS_2$ and the like, graphite intercalation compounds, and graphite fluorides. Similar problems can arise with these materials.

Further, when a solid electrolyte is used as the electrolyte, the contact area between the solid electrolyte and the electrode active material tends to decrease, as earlier noted. Accordingly, when a volumetric change occurs in the electrode active material in association with the charge and discharge operations of the cell, bonds between the active material and the electrolyte tend to be lost. Moreover, since cell materials are all formed from solid substances, and there are no elastic members for absorbing the volumetric change of the electrode active material during charging and discharging, a dimensional change may occur in the cell, leading to sealing failure of cell seals.

An object of the present invention is to provide a molded solid electrolyte that solves the above enumerated problems, and that exhibits excellent electrochemical properties such as high ionic conductivity and has flexibility and hence excellent workability.

Another object of the present invention is to provide a molded electrode that permits the construction of an electrochemical device having excellent operating characteristics, and that has excellent formability and workability.

Still another object of the present invention is to provide an electrochemical device that shows stable operation by resolving the problems associated with the volumetric change of the electrode active material occurring during the operation of the electrochemical device.

DISCLOSURE OF THE INVENTION

The molded solid electrolyte of the present invention comprises a solid electrolyte and a hydrogenated block copolymer obtained by hydrogenating a straight chain or branched block copolymer; the straight chain or branched block copolymer containing a block (A) comprising polybutadiene whose 1,2-vinyl bond content is 15% or less and a block (B) comprising a butadiene (co)polymer consisting of 50 to 100% by weight of butadiene and 0 to 50% by weight of other monomers and in which 1,2-vinyl bond content of the butadiene is 20 to 90%, wherein (A)/(B)=5 to 70/95 to 30% by weight.

The molded electrode of the present invention comprises an electrode active material and the hydrogenated block copolymer described above.

The electrochemical device of the present invention comprises a pair of electrodes and an electrolyte layer, wherein at least either the pair of electrodes or the electrolyte layer contains the hydrogenated block copolymer described above.

The hydrogenated block copolymer, one of the primary components of the present invention, is a hydrogenated block copolymer obtained by hydrogenating 90% or more of a straight chain or branched block polymer (hereinafter called the unhydrogenated block polymer) which contains at least one polybutadiene block (A) (hereinafter called the block A) whose 1,2-vinyl bond content is 15% or less and at least one butadiene (co)polymer (hereinafter called the block B) which consists of 50 to 100% by weight of butadiene and 0 to 50% by weight of other monomers and in which the 1,2-vinyl bond content of the butadiene is 20 to 90%, wherein the ratio between the block A and block B in the molecules is 5 to 70/95 to 30 (% by weight).

In the hydrogenated block polymer, by hydrogenation the block A becomes a crystalline polyethylene-like structural block and the block B becomes a rubber-like block with olefin skeleton.

Here, as the solid electrolyte of the molded solid electrolyte, a lithium ion conductive solid electrolyte is used.

Further, an amorphous solid electrolyte is used as the solid electrolyte.

As the lithium ion amorphous solid electrolyte, an electrolyte composed primarily of a sulfide, and particularly, an electrolyte containing silicon, is preferably used.

The molded solid electrolyte can also contain an electronically insulating structural member.

Preferably, the molded electrode contains a lithium ion conductive inorganic solid electrolyte.

As the lithium ion conductive inorganic solid electrolyte, an amorphous electrolyte composed primarily of a sulfide is preferably used.

Preferably, the molded electrode contains a structural member, and more preferably, the structural member is electron conductive.

BEST MODE FOR CARRYING OUT THE INVENTION

Figure 1:
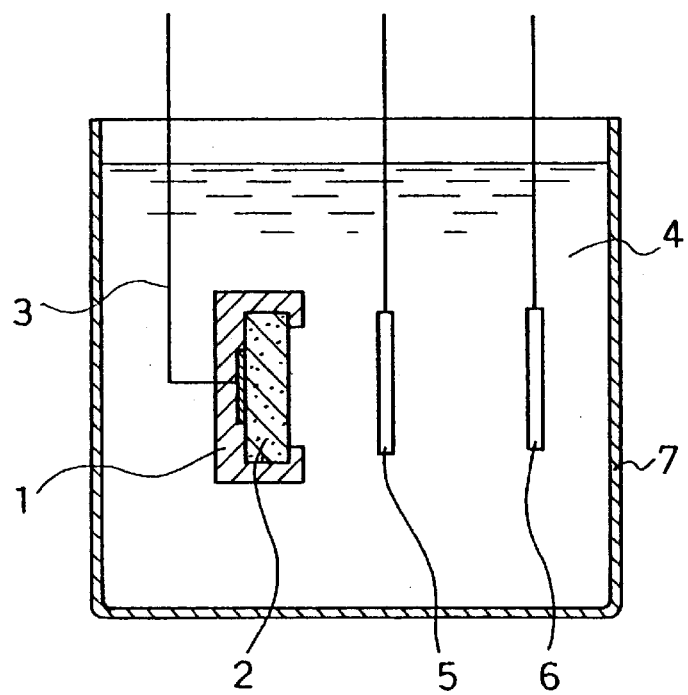
FIG. 1 is a vertical cross sectional view showing in simplified form the construction of an apparatus for evaluating the electrochemical properties of a molded electrode in one example of the present invention.

The present invention is based on the findings of the present inventors that by using as a polymer compound a hydrogenated block copolymer having a crystalline polyethylene-like structural block and an olefin skeleton rubber-like block, the ion transfer between substances constituting an electrochemical device, for example, between inorganic solid electrolyte particles, between electrode active material particles, or across the interface between the electrode active material and the electrolyte, is facilitated and high formability and flexibility can be given to a molded solid electrolyte, a molded electrode and the like, to improve their workability.

For example, if a polymer compound is mixed to give flexibility to an inorganic solid electrolyte, the surfaces of the inorganic solid electrolyte particles would be covered with the insulating polymer compound. As the result, ionic conduction between the solid electrolyte particles is interfered, and the ionic conductivity of the resulting complex of the ion conductive inorganic solid electrolyte and the polymer compound would decrease. However, if the hydrogenated block copolymer having a crystalline polyethylene-like structural block and a rubber-like block with olefin network according to the present invention is used as the polymer compound, the bonding between the solid electrolyte particles can be increased without appreciably impairing the high ionic conductivity and flexibility and the like are given to the molded solid electrolyte.

The hydrogenated block copolymer according to the present invention, by introducing the crystalline polyethylene-like structural block thereinto, can give flexibility even in a small amount and a lithium ion conductive molded article having high conductivity can be obtained.

The present invention will be described in detail below.

The 1,2-vinyl bond content in block A before hydrogenation is an important factor that determines the melting point attributed to the block A and the cohesive force between the polyethylene-like structural blocks after hydrogenation. In particular, if the cohesive force drops, it becomes impossible to reduce the amount to be added, and a lithium ion conductive complex having high conductivity cannot be obtained.

The 1,2-vinyl bond content in the block A must be 15% or less. If the 1,2-vinyl bond content in the block A exceeds 15%, the cohesive force of the block A after hydrogenation decreases, which is undesirable, and the melting point also drops, which is also undesirable.

Block B before hydrogenation is a block segment comprising a butadiene (co)polymer which consists of 50 to 100% by weight of butadiene and 0 to 50% by weight of other monomers, with the 1,2-vinyl bond content of the butadiene being 20 to 90%, and becomes a rubber-like block by hydrogenation.

In the block B, since the 1,2-vinyl bond of the butadiene becomes a butene structure by hydrogenation, the content directly influences the glass transition temperature attributed to the block B after hydrogenation and, in the complex with the lithium ion conductive solid electrolyte, becomes a factor that influences flexibility.

In the present invention, the 1,2-vinyl bond content in the block B must be 20% or higher but not exceed 90%. If the 1,2-vinyl bond content in the block B is less than 20%, crystalline parts occur after hydrogenation and flexibility decreases, which is not desirable. On the-other hand, if it exceeds 90%, the butene content increases excessively to raise the glass transition temperature; this decreases the flexibility and is not desirable.

As other monomers copolymerizable with the butadiene in the block B, there are aromatic vinyl compounds such as styrene, α-methyl styrene and para-methyl styrene, (meth) acrylate esters such as methyl methacrylate and methyl acrylate, and isoprene and the like; of these, styrene and isoprene are particularly preferable.

The amount of these monomers used is 0 to 50% of all the monomers constituting the block B. When these monomers are used, if the amount of other monomers used exceeds 50%, flexibility after hydrogenation drops, which is not desirable. Further, the block copolymer before hydrogenation may include a polymer block (hereinafter referred to as the block X) composed primarily of an aromatic vinyl compound.

The hydrogenated block copolymer of the present invention is a hydrogenated block copolymer obtained by hydrogenating a straight chain or branched block copolymer containing at least one block A, at least one block B, and, if necessary, block X.

The unhydrogenated block copolymer is, to be specific, a copolymer expressed by the structural formula A-(B-A)$_l$, (A-B)$_m$ wherein l and m are 1 or larger or (A-B-X)$_n$ wherein n is 1 or larger.

Among block copolymers having such a structure, a tri-block copolymer of A-B-A or a tri-block copolymer of A-B-X wherein X is a polystyrene block is preferable.

The ratio of the block A to the block B in the unhydrogenated block copolymer is block A/Block B=5 to 70/95 to 30% by weight.

If the block A in the unhydrogenated block copolymer is less than 5% by weight with the block B exceeding 95% by weight, the crystalline block segment is not sufficient and the cohesive force decreases; as the result, high formability cannot be obtained in a range where the adding amount is small. If the block A exceeds 70% by weight with the block B less than 30% by weight, the hardness of the hydrogenated block copolymer increases and flexibility is lost.

In the case of the unhydrogenated block copolymer of (A-B-X)$_n$, the ratio of the block X in the unhydrogenated block copolymer is usually 50% by weight or less, preferably 40% by weight or less, and more preferably 30% by weight or less.

If the block X exceeds 50% by weight, the flexibility of the hydrogenated block copolymer decreases and hence, the flexibility of the molded solid electrolyte decreases. Here also, it is desirable that the ratio of the block A to the block B be held within the earlier noted range, in the portion excluding the block X.

The percentage of the hydrogen added to the block copolymer, after hydrogenation, must be 90% or higher. If the percentage of the hydrogenation is less than 90%, the melting point drops and the heat resistance decreases.

The hydrogenated block copolymer has the characteristic of exhibiting the melting point attributed to the block A after hydrogenation at a higher temperature side and the glass transition point attributed to the block B after hydrogenation at a lower temperature side.

The melting point of the hydrogenated block copolymer is a factor that directly affects the heat resistance of the composition of the present invention, and is usually 80° C. or higher, preferably 85° C. or higher, and particularly preferably 95° C. or higher. If the melting point is lower than 80° C., the heat resistance of the composition is not enough and poses a problem in practical use. In conventional electrochemical devices, an upper limit to the operating temperature range of the device is imposed by the boiling point of the electrolyte used; in the case of an electrochemical device using a solid electrolyte as the electrolyte, the upper limit of the operating temperature range becomes higher. Further, since an activation energy of the conduction of a solid electrolyte is generally higher than that of a liquid electrolyte, ion transfer at higher speed at a higher temperature in the electrolyte and, therefore, electrochemical devices using solid electrolytes exhibit superior properties at high temperature to those of devices using liquid electrolytes. Accordingly, it is required that the polymer compound used have high heat resistance. Further, in the case of a fuel cell or the like using a proton conducting solid electrolyte, the temperature of the device can rise close to 100° C. because of the heat generated during device operation. It is, therefore, more preferable that the melting point of the hydrogenated block copolymer is 95° C. or higher.

The glass transition temperature at a lower temperature side of the hydrogenated block copolymer, on the other hand, is a factor that affects the low temperature characteristics of the composition, and is usually −25° C. or lower, preferably −30° C. or lower, and particularly preferably −35° C. or lower. If the glass transition temperature at a lower temperature side is higher than −25° C., dynamic properties at low temperatures degrade, and also the ionic conductivity at a lower temperature side of the composition decreases significantly.

The hydrogenated block copolymer can be produced by using known techniques. For example, the method disclosed in Japanese Patent Unexamined Publication No. 4-342752 can be used.

As solid electrolytes so far found to exhibit ionic conductivity of $10^{-4}$ S/cm or higher at room temperature, there have been found solid electrolytes of copper ion conductive, silver ion conductive, proton conducting, and fluoride ion conductive and the like. Among others, the lithium ion conductive solid electrolyte has been attracting attention as an electrolyte for all-solid lithium cells. However, lithium cells which generate high voltage comprise a cathode that exhibits a strong oxidizing power and an anode that exhibits a strong reducing power. Therefore, even if the polymer compound added to the electrolyte layer exhibits the characteristic that does not interfere with ion transfer and that provides a high binding property, deterioration may occur through contact with the cathode or anode. However, the hydrogenated block copolymer of the present invention is stable to such oxidation reduction reactions and, thus, offers the greatest effect when used with a lithium ion conductive solid electrolyte for the construction of a molded solid electrolyte.

The kinds of the solid electrolyte, for example in the case of lithium ion conductive electrolytes, may be divided into the crystalline type such as $Li_{1.3}Sc_{0.3}Ti_{1.7}(PO_4)_3$ and $Li_{0.2}La_{0.6}TiO_3$, and the amorphous type such as $Li_2S-SiS_2$. Many crystalline solid electrolytes show anisotropy to ionic conductivity, and in order to realize a high ionic conductivity, it often becomes necessary to sinter the molded article and connect ion conductive paths between solid electrolyte particles. On the other hand, amorphous solid electrolytes show isotropy to ionic conductivity, and ion conductive paths between particles can be easily connected by a pressure molding process. It is therefore preferable to use an amorphous solid electrolyte for a molded solid electrolyte if it is intended to simplify the process of electrochemical device fabrication.

Lithium ion conductive amorphous solid electrolytes include those consisting essentially sulfides such as $Li_2S-SiS_2$, and those consisting essentially oxides such as $Li_2S-SiO_2$. Electrolytes consisting primarily of sulfides have high reactivity with moisture and the like, and there is a need to use a nonpolar solvent when mixing with a polymer compound. The hydrogenated block copolymer of the present invention is soluble in a nonpolar solvent, and can form a complex without impairing the properties of lithium ion conductive amorphous solid electrolytes consisting essentially sulfides.

For lithium ion conductive inorganic solid electrolytes, those having a high ionic conductivity and wide potential window are preferable, and amorphous electrolytes consisting primarily of sulfides, which possess both of these characteristics, are particularly preferable.

For lithium ion conductive amorphous inorganic solid electrolytes, if a lithium sulfide and a silicon sulfide are used as starting materials, evaporation of the starting materials can be suppressed when synthesizing the solid electrolyte, since the vapor pressure of the starting materials is low. This serves to simplify the process of solid electrolyte synthesis; therefore, for lithium ion conductive amorphous inorganic compounds, those containing silicon are particularly preferable for use.

Further, by adding an electronically insulating structural member, the mechanical strength of the lithium ion conductive molded solid electrolyte can be further increased.

For specific examples of the electronically insulating structural member, there are a woven fabric, non-woven fabric, porous film, and the like.

In a method of producing the molded solid electrolyte of the present invention, a hydrogenated block copolymer solution is added to solid electrolyte powder and, then, mixed and dispersed using a paint conditioner or the like to obtain a slurry with the solid electrolyte powder dispersed through the hydrogenated block copolymer solution. Next, the slurry is applied onto a substrate having releasing property to obtain a film-like molded solid electrolyte; alternatively, the slurry is applied to or impregnated into an electronically insulating structural member such as a woven fabric to obtain a sheet-like molded solid electrolyte.

The hydrogenated block copolymer of the present invention, when complexed with other particles, does not interfere with ion transfer, provides good inter-particle bonding, and permits the production of a molded article having high workability. Further, in the electrodes used in an electrochemical device, ions are transferred between the electrode active material and the electrolyte. As previously noted, high formability must be given to the electrodes without interfering with the ion transfer; therefore, by using the hydrogenated block copolymer of the present invention, a molded electrode that can satisfy these requirements can be produced.

Furthermore, when a solid electrolyte is used as the electrolyte, if a binder is added to improve the formability, the electrode reaction speed tends to drop, which is a problem as previously noted; therefore, using the hydrogenated block copolymer as the binder is particularly effective.

Moreover, for the active material used as the electrode active material in lithium cells, the oxidation reduction resistance of the binder is important, as previously stated; for this reason also, using the hydrogenated block copolymer is particularly effective. In that case, the molded electrode contains the electrode active material or the electrode active material and solid electrolyte, and the solid electrolyte used is of the lithium ion conductive type.

For the lithium ion conductive solid electrolyte, the amorphous type is preferable, since it does not have anisotropy with respect to ion conductive paths and thus makes it easy to connect ion conductive paths between the electrode active material and the electrolyte. For the amorphous lithium ion conductive solid electrolyte, an electrolyte consisting essentially of a sulfide is particularly preferable for use, since such an electrolyte exhibits a high ionic conductivity and wide potential window.

Further, by adding a structural member to the molded electrode, the mechanical strength of the molded electrode can be further increased. A structural member formed from an electron conductive material is particularly preferable for use, since such a structure serves to increase the electron conductivity within the electrode. Examples of the electron conductive structural member that can be used here are a metallic mesh and the like formed from stainless steel, titanium, copper, and the like.

The hydrogenated block copolymer used in the present invention contains a rubber-like block with olefin skeleton as well as a crystalline polyethylene-like structural block. The rubber-like block with olefin skeleton has a large free volume, and can therefore absorb the volumetric change of the electrode active material occurring during the operation of the electrochemical device. Further, since the crystalline polyethylene-like structural block provides strong bonding and flexibility between the constituent particles of the electrochemical device, problems associated with the decreased inter-particle bonding due to the volumetric change of the active material can be resolved, and an electrochemical device that is stable in operation can thus be achieved.

The present invention will be described in detail below by way of example.

The synthesis of lithium ion conductive inorganic solid electrolytes and the measurement of their ion conductivity hereinafter described were all conducted in a dry argon atmosphere.

First, synthesizing examples of hydrogenated block copolymers will be described. In Table 1, the structures and properties of the hydrogenated block copolymers are shown. In the table, A, B, and X in the component structural formula represents the block A, block B, and polystyrene block, respectively.

Methods of their production are shown below.

1) Production of the Hydrogenated Block Copolymer (H-1)

3.2 kg of cyclohexane and 1.2 kg of butadiene are introduced into an autoclave with a net capacity of 20 liters, and 33 ml of a 14% by weight tetrahydrofuran solution of n-butyl lithium is added. The mixture is heated to about 70° C., and when the percentage of addition reaches 100%, 2.8 kg of butadiene and 108 ml of tetrahydrofuran are further added, and the polymerization is continued at about 70° C. When the percentage of addition reaches 100%, 26 ml of a 20% by weight tetrahydrofuran solution of dicyclosilane is added, and is allowed to react for about 20 minutes, thereby coupling diblock polymers to obtain a triblock copolymer. After the completion of the polymerization, the reaction solution is maintained at about 70° C., and 3 g of n-butyl lithium, 3 g of 2,6-di-t-butyl-p-cresol, 1 g of bis (cyclopentadienyl)titanium dichloride, and 2 g of diethylaluminum chloride are added, and are allowed to react for one hour under a hydrogen pressure of 10 kg/cm$^2$. After stream stripping, the reaction liquid is dried on rolls, to obtain the hydrogenated block copolymer (H-1).

2) Production of the Hydrogenated Block Copolymers (H-2) to (H-4)

Similarly to the production of the hydrogenated block copolymer (H-1), the hydrogenated block copolymers (H-2) to (H-4) are obtained by varying the monomer combination, monomer amounts, catalyst amounts, polymerization temperature, polymerization time and the like to give the hydrogenated block copolymer produced as shown in Table 1.

TABLE 1

| Sample number | H-1 | H-2 | H-3 | H-4 |
|---|---|---|---|---|
| Component structural formula | A-B-A | A-B-A | A-B-A | A-B-X |
| 1,2-vinyl bond content (%) | 12 | 13 | 12 | 13 |

TABLE 1-continued

| Sample number | H-1 | H-2 | H-3 | H-4 |
|---|---|---|---|---|
| in block A | | | | |
| Amount of block A (% by weight) | 30 (15 × 2) | 20 (10 × 2) | 40 (20 × 2) | 15 |
| 1,2-vinyl bond content (%) in block B | 42 | 41 | 65 | 42 |
| Amount of block B (% by weight) | 70 | 80 | 60 | 70 |
| Amount of block X (% by weight) | | | | 15 |
| Properties | | | | |
| Percentage of hydrogenation (%) | 98 | 97 | 98.5 | 97.5 |
| Melting point (at higher temperature side) | 92 | 89 | 90 | 92 |
| Glass transition temperature (at lower temperature side) | −52 | −54 | −55 | −51 |
| MFR (230° C. × 2.16 kg) | 10 | 5 | 8 | 0.5 |
| Molecular weight (× 10⁴) | 15 | 20 | 15 | 15 |

EXAMPLE 1

A lithium ion conductive molded solid electrolyte was obtained by using a lithium ion conductive glass sulfide represented by $0.6Li_2S$-$0.4SiS_2$ as the solid electrolyte and (H-1) as the hydrogenated block copolymer. The details are shown below.

First, as the solid electrolyte, the lithium ion conductive amorphous solid electrolyte represented by $0.6Li_2S$- $0.4SiS_2$ was synthesized in the following manner.

Lithium sulfide ($Li_2S$) and silicon sulfide ($SiS_2$) were mixed at a ratio of 0.6:0.4 by mole, and the mixture was introduced into a glass-like carbon crucible. The crucible was then placed in a vertical furnace and heated up to 950° C. in an argon stream to melt the mixture. After heating for two hours, the crucible was dropped into liquid nitrogen for rapid cooling, to obtain the lithium ion conductive amorphous solid electrolyte represented by $0.6Li_2S$-$0.4SiS_2$.

Using the thus obtained lithium ion conductive amorphous solid electrolyte and the hydrogenated block copolymer (H-1), the lithium ion conductive molded solid electrolyte was produced in the following manner.

First, the solid electrolyte obtained in the above process was pulverized to 350 mesh or finer powder. To the solid electrolyte powder, a toluene solution of (H-1) was then added, and thoroughly kneaded to obtain a slurry. The mixing ratio, when kneading, was chosen such that the solid content of the hydrogenated block copolymer to the solid electrolyte powder was 2:98 by weight. The thus obtained slurry was applied onto a fluorocarbon resin plate by a doctor blade method, and was dried by allowing the toluene to evaporate under a reduced pressure at 100° C. After drying for three hours, by separating from the fluorocarbon resin plate, the lithium ion conductive molded solid electrolyte was obtained.

The ionic conductivity of the lithium ion conductive molded solid electrolyte was measured by the AC impedance method described below.

First, the lithium ion conductive molded solid electrolyte sheet obtained in the above process was cut out into the shape of a disk with a diameter of 10 mm. Then, a 10-mm diameter platinum plate as impedance measuring electrode was adhered by pressure onto each side of the disk to form an ionic conductivity measuring cell.

The AC impedance was measured by applying an AC voltage of 10 mV using a vector impedance analyzer. As the result, the ionic conductivity of the lithium ion conductive molded solid electrolyte thus measured was $2.45 \times 10^{-4}$ S/cm.

As a comparative example, the solid electrolyte powder was pressure molded without adding the hydrogenated block copolymer, and when the ionic conductivity was measured in the same manner, the result showed $4.5 \times 10^{-4}$ S/cm.

Next, to examine the flexibility of the lithium ion conductive molded solid electrolyte for the evaluation of workability, a bending test was conducted. The bending test was carried out by winding the lithium ion conductive molded solid electrolyte around a 50-mm diameter stainless steel rod and visually inspecting the condition of the molded article. The result showed that no externally discernible faults were observed on the lithium ion conductive molded solid electrolyte of this example, thus demonstrating that the molded article had high flexibility evev in the bending test.

As described above, it has been found that, according to the present invention, a lithium ion conductive molded solid electrolyte having a high lithium ion conductivity and excellent workability can be obtained.

EXAMPLE 2

Except that (H-1) used as the hydrogenated block copolymer in EXAMPLE 1 was replaced by (H-2), a lithium ion conductive molded solid electrolyte was obtained in the same manner as in EXAMPLE 1.

When the ionic conductivity of the lithium ion conductive molded solid electrolyte was measured in the same manner as in EXAMPLE 1, the result showed $2.8 \times 10^{-4}$ S/cm.

Further, in the bending test conducted in the same manner as in EXAMPLE 1, no externally discernible faults were observed, thus demonstrating that the electrolyte had high flexibility.

EXAMPLE 3

Except that (H-1) used as the hydrogenated block copolymer in EXAMPLE 1 was replaced by (H-3), a lithium ion conductive molded solid electrolyte was obtained in the same manner as in EXAMPLE 1.

When the ionic conductivity of the lithium ion conductive molded solid electrolyte was measured in the same manner as in EXAMPLE 1 the result showed $3.4 \times 10^{-4}$ S/cm.

Further, in the bending test conducted in the same manner as in EXAMPLE 1, no externally discernible faults were observed, thus demonstrating that the electrolyte had high flexibility.

EXAMPLE 4

Except that (H-1) used as the hydrogenated block copolymer in EXAMPLE 1 was replaced by (H-4), a lithium ion conductive molded solid electrolyte was obtained in the same manner as in EXAMPLE 1.

When the ionic conductivity of the lithium ion conductive molded solid electrolyte was measured in the same manner as in EXAMPLE 1, the result showed $2.5 \times 10^{-4}$ S/cm.

Further, in the bending test conducted in the same manner as in EXAMPLE 1, no externally discernible faults were observed, thus demonstrating that the electrolyte had high flexibility.

EXAMPLE 5

A lithium ion conductive molded solid electrolyte was produced by using a lithium ion conductive amorphous solid electrolyte represented by $0.01Li_3PO_4$-$0.63Li_2S$-$0.36SiS_2$ as the lithium ion conductive inorganic solid electrolyte and, as in EXAMPLE 3, (H-3) as the hydrogenated block copolymer. The details are shown below.

First, as the lithium ion conductive inorganic solid electrolyte, the lithium ion conductive amorphous solid electrolyte represented by $0.01Li_3PO_4$-$0.63Li_2S$-$0.36SiS_2$ was synthesized in the following manner.

First, a glass matrix for synthesizing the amorphous solid electrolyte was synthesized. Lithium sulfide ($Li_2S$) and silicon sulfide ($SiS_2$) were mixed at a ratio of 0.64:0.36 by mole, and the mixture was introduced into a glass-like carbon crucible and melted at 950° C. in a horizontal furnace. After that, the molten liquid was rapidly cooled on a twin roller, to obtain an amorphous solid electrolyte represented by $0.64Li_2S$-$0.36SiS_2$. This amorphous solid electrolyte as the glass matrix was pulverized, and lithium phosphate was mixed into the powder so as to provide the composition $0.01Li_3PO_4$-$0.63Li_2S$-$0.36SiS_2$. This mixture was heated and then rapidly cooled in the same manner as above, to obtain the lithium ion conductive amorphous solid electrolyte represented by $0.01Li_3PO_4$-$0.63Li_2S$-$0.36SiS_2$.

Except that the solid electrolyte obtained in the above process was used in place of the solid electrolyte represented by $0.6Li_2S$-$0.4SiS_2$ and that (H-3) used in EXAMPLE 3 was used as the hydrogenated block copolymer, the lithium ion conductive molded solid electrolyte was then obtained in the same manner as in EXAMPLE 1.

When the ionic conductivity of the lithium ion conductive molded solid electrolyte was measured in the same manner as in EXAMPLE 1, the result showed $5.3 \times 10^{-4}$ S/cm. As a comparative example, when the ionic conductivity of the solid electrolyte powder itself was measured in the same manner as in EXAMPLE 1, the result showed $7.8 \times 10^{-4}$ S/cm.

Further, in the bending test conducted in the same manner as in EXAMPLE 1, no externally discernible faults were observed, thus demonstrating that the electrolyte had high flexibility.

EXAMPLE 6

By using a lithium ion conductive amorphous solid electrolyte represented by $0.05Li_2O$-$0.60Li_2S$-$0.35SiS_2$ as the lithium ion conductive inorganic solid electrolyte and, as in EXAMPLE 3, (H-3) as the hydrogenated block copolymer, a lithium ion conductive molded solid electrolyte was produced. The details are shown below.

The lithium ion conductive amorphous solid electrolyte represented by $0.05Li_2O$-$0.60Li_2S$-$0.35SiS_2$ was synthesized in the same manner as in EXAMPLE 5, except that lithium oxide was used in place of lithium phosphate.

Except that the lithium ion conductive solid electrolyte obtained in the above process was used, and that (H-3) used in EXAMPLE 3 was used as the hydrogenated block copolymer, the lithium ion conductive molded solid electrolyte was obtained in the same manner as in EXAMPLE 1.

When the ionic conductivity of the lithium ion conductive molded solid electrolyte was measured in the same manner as in EXAMPLE 1, the result showed $4.3 \times 10^{-4}$ S/cm. As a comparative example, when the ionic conductivity of the solid electrolyte powder itself was measured in the same manner as in EXAMPLE 1, the result showed $6.6 \times 10^{-4}$ S/cm.

Further, in the bending test conducted in the same manner as in EXAMPLE 1, no externally discernible faults were observed, thus demonstrating that the electrolyte had high flexibility.

EXAMPLE 7

A lithium ion conductive molded solid electrolyte was produced by using a lithium ion conductive amorphous solid electrolyte represented by $0.30LiI$-$0.35Li_2S$-$0.35SiS_2$ as the lithium ion conductive inorganic solid electrolyte and, as in EXAMPLE 1, (H-1) as the hydrogenated block copolymer. The details are shown below.

To begin with, as the lithium ion conductive inorganic solid electrolyte, the lithium ion conductive amorphous solid electrolyte represented by $0.30LiI$-$0.35Li_2S$-$0.35SiS_2$ was synthesized in the following manner.

First, except that the mixing ratio of the starting materials was varied, an amorphous solid electrolyte represented by $0.5Li_2S$-$0.5SiS_2$ was obtained in the same manner as in EXAMPLE 1. This amorphous solid electrolyte as a glass matrix was pulverized, and lithium iodide was mixed into the powder so as to provide the composition $0.30LiI$-$0.35Li_2S$-$0.35SiS_2$. This mixture was again heated and rapidly cooled in like manner, to obtain the lithium ion conductive amorphous solid electrolyte represented by $0.30LiI$-$0.35Li_2S$-$0.35SiS_2$.

Except that the solid electrolyte obtained in the above process was used in place of the solid electrolyte represented by $0.6Li_2S$-$0.4SiS_2$, the lithium ion conductive molded solid electrolyte was then obtained in the same manner as in EXAMPLE 1.

When the ionic conductivity of the lithium ion conductive molded solid electrolyte was measured in the same manner as in EXAMPLE 1, the result showed $3.5 \times 10^{-4}$ S/cm. As a comparative example, when the ionic conductivity of the solid electrolyte powder itself was measured in the same manner as in EXAMPLE 1, the result showed $7.2 \times 10^{-4}$ S/cm.

Further, in the bending test conducted in the same manner as in EXAMPLE 1, no externally discernible faults were observed, thus demonstrating that the electrolyte had high flexibility.

EXAMPLE 8

A lithium ion conductive molded solid electrolyte was produced by using a lithium ion conductive amorphous solid electrolyte represented by $0.5Li_2S$-$0.5P_2S_5$ as the lithium ion conductive inorganic solid electrolyte and, as in EXAMPLE 1, (H-1) as the hydrogenated block copolymer. The details are shown below.

First, as raw materials for the solid electrolyte, lithium sulfide ($Li_2S$) and phosphorus sulfide ($P_2S_5$) were mixed at a ratio of 0.5:0.5 by mole. The mixture was then sealed within a silica tube and melted at 900° C., after which the silica tube was immersed into water for rapid cooling, to obtain the amorphous solid electrolyte represented by $0.5Li_2S$-$0.5P_2S_5$.

Except that the solid electrolyte obtained in the above process was used in place of the solid electrolyte represented by $0.6Li_2S$-$0.4SiS_2$, the lithium ion conductive molded solid electrolyte was then obtained in the same manner as in EXAMPLE 1.

When the ionic conductivity of the lithium ion conductive molded solid electrolyte and that of the solid electrolyte powder as a comparative example were measured in the same manner as in EXAMPLE 1, the results showed that the ionic conductivity of the molded solid electrolyte with the hydrogenated block copolymer added thereto was $1.0 \times 10^{-4}$ S/cm, as compared with $1.6 \times 10^{-4}$ S/cm for the solid electrolyte itself, the rate of decrease thus being held within one half.

Further, in the bending test conducted in the same manner as in EXAMPLE 1, no externally discernible faults were observed, thus demonstrating that the electrolyte had high flexibility.

EXAMPLE 9

A lithium ion conductive molded solid electrolyte was produced by using a lithium ion conductive amorphous solid electrolyte represented by $0.6Li_2S$-$0.4B_2S_3$ as the lithium ion conductive inorganic solid electrolyte and, as in EXAMPLE 1, (H-1) as the hydrogenated block copolymer. The details are shown below.

First, except that lithium sulfide ($Li_2S$) and boron sulfide ($B_2S_3$) mixed at a ratio of 0.6:0.4 by mole were used as the raw materials for the solid electrolyte, the amorphous solid electrolyte represented by $0.6Li_2S$-$0.4B_2S_3$ was obtained in the same manner as in EXAMPLE 8.

Except that the solid electrolyte obtained in the above process was used in place of the solid electrolyte represented by $0.6Li_2S$-$0.4SiSB_2$, the lithium ion conductive molded solid electrolyte was then obtained in the same manner as in EXAMPLE 1.

When the ionic conductivity of the lithium ion conductive molded solid electrolyte and that of the solid electrolyte powder as a comparative example were measured in the same manner as in EXAMPLE 1, the results showed that the ionic conductivity of the molded solid electrolyte with the hydrogenated block copolymer added thereto was $1.2 \times 10^{-4}$ S/cm, as compared with $1.9 \times 10^{-4}$ S/cm for the solid electrolyte itself, the rate of decrease thus being held within one half.

Further, in the bending test conducted in the same manner as in EXAMPLE 1, no externally discernible faults were observed, thus demonstrating that the electrolyte had high flexibility.

EXAMPLE 10

Using an amorphous solid electrolyte represented by $0.6Li_2S$-$0.4SiS_2$ as the lithium ion inorganic solid electrolyte, as in EXAMPLE 1, and using (H-3) as the hydrogenated block copolymer, various lithium ion conductive molded solid electrolytes were obtained by varying the composition ratio between the lithium ion conductive inorganic solid electrolyte and the hydrogenated block copolymer. The details are shown below.

Using the lithium ion conductive inorganic solid electrolyte obtained in EXAMPLE 1 and (H-3), lithium ion conductive molded solid electrolytes with varying composition ratios were obtained by the same method as used in EXAMPLE 1.

Table 2 shows the composition ratio versus ionic conductivity relationships of the various lithium ion conductive molded solid electrolytes. Table 2 also shows the results of the bending test.

TABLE 2

| Ratio of copolymer (% by weight) | 0.4 | 1.0 | 2.0 | 3.5 | 5.0 |
|---|---|---|---|---|---|
| Ratio of solid electrolyte (% by weight) | 99.6 | 99.0 | 98.0 | 96.5 | 95.0 |
| Ionic conductivity ($\times 10^{-4}$ S/cm) | 4.1 | 3.8 | 3.4 | 2.8 | 2.0 |
| Bendding test | Good | Good | Good | Good | Good |
| Remarks | | | Example 3 | | |

From the above results, it can be seen that by using the hydrogenated block copolymer in only small amounts, a lithium ion conductive molded solid electrolyte can be obtained that has excellent flexibility as well as a very high ionic conductivity. The hydrogenated block copolymer has the characteristic that even if it is added in relatively large amounts, the decrease in the ionic conductivity is small.

EXAMPLE 11

A lithium ion conductive molded solid electrolyte was obtained by using the amorphous solid electrolyte represented by $0.01Li_3PO_4$-$0.63Li_2S$-$0.36SiS_2$ obtained in EXAMPLE 5 as the lithium ion conductive inorganic solid electrolyte, and (H-3) as the hydrogenated block copolymer, and also using a polyethylene mesh as the electronically insulating structural member. The details are shown below.

The slurry containing the solid electrolyte and designated polymers was obtained in the same manner as in EXAMPLE 1. Next, using a doctor blade method, the slurry was charged into the openings in a polyethylene mesh having a porosity of 70%. After that, by drying the mesh by evaporating the toluene under a reduced pressure at 40° C., thus obtaining the lithium ion conductive molded solid electrolyte.

The ionic conductivity of the lithium ion conductive molded solid electrolyte, when measured in the same manner as in EXAMPLE 1, was $3.0 \times 10^{-4}$ S/cm.

In the bending test conducted in the same manner as in EXAMPLE 1, no externally discernible faults were observed, and also, in the bending test conducted using a 5-mm diameter stainless steel rod, no faults were observed, thus demonstrating that the lithium ion conductor according to this example had high flexibility.

As described above, it has been found that a lithium ion conductive molded solid electrolyte having particularly high workability as well as a high lithium ion conductivity can be obtained according to the present invention using a lithium ion conductive inorganic solid electrolyte, a hydrogenated block copolymer, and an electronically insulating structural member.

EXAMPLE 12

Except that the $0.01Li_3PO_4$-$0.63Li_2S$-$0.36SiS_2$ used as the lithium ion conductive inorganic solid electrolyte in EXAMPLE 11 was replaced by the lithium ion conductive amorphous solid electrolyte represented by $0.6Li_2S$-$0.4SiS_2$ obtained in EXAMPLE 1, that (H-3) used as the hydrogenated block copolymer in EXAMPLE 11 was replaced by (H-1), and that the polyethylene mesh used as the electronically insulating structural member in EXAMPLE 11 was replaced by a glass fiber mesh, a lithium ion conductive molded solid electrolyte was produced in the same manner as in EXAMPLE 11.

The ionic conductivity of the resulting lithium ion conductive molded solid electrolyte, when measured in the same manner as in EXAMPLE 1, was $3.3 \times 10^{-4}$ S/cm.

In the bending test conducted in the same manner as in EXAMPLE 1, no externally discernible faults were observed, and also, in the bending test conducted using a 5-mm diameter stainless steel rod, no faults were observed, thus demonstrating that the lithium ion conductive molded solid electrolyte according to this example had high flexibility.

Comparative Example 1

Using a styrene-ethylene-butylene-styrene block copolymer (KRATON G1652 manufactured by SHELL, hereinafter designated SEBS) having no crystalline block structures, and using, as in EXAMPLE 1, an amorphous solid electrolyte represented by $0.6Li_2S-0.4SiS_2$ as the lithium ion conductive inorganic solid electrolyte, various lithium ion conductive molded solid electrolytes were obtained by varying the composition ratio of the lithium ion conductive inorganic solid electrolyte and the SEBS. The details are shown below.

Using the SEBS and the lithium ion conductive inorganic solid electrolyte obtained in EXAMPLE 1, lithium ion conductive molded solid electrolytes with varying composition ratios were obtained by the same method as used in EXAMPLE 1.

Table 3 shows the composition ratio versus ionic conductivity relationships of the various lithium ion conductive molded solid electrolytes. Table 3 also shows the results of the bending test.

TABLE 3

| Ratio of copolymer (% by weight) | 0.4 | 1.0 | 2.0 | 3.5 | 5.0 |
|---|---|---|---|---|---|
| Ratio of solid electrolyte (% by weight) | 99.6 | 99.0 | 98.0 | 96.5 | 95.0 |
| Ionic conductivity ($\times 10^{-4}$ S/cm) | — | — | — | 0.9 | 0.5 |
| Bendding test | Unable to recover as a molded article | Unable to recover as a molded article | Unable to recover as a molded article | Cracks developed | Good |
| Remarks | Unable to recover as a molded article; hence unable to measure conductivity | | | | |

Comparative Example 2

Using a copolymer (hereinafter designated H-SBR) obtained by hydrogenating a styrene-butadiene random copolymer, which was produced by polymerizing 5% by weight of styrene and 95% by weight of butadiene, with the 1,2-vinyl bond content of the butadiene being 80%, and using, as in EXAMPLE 1, an amorphous solid electrolyte represented by $0.6Li_2S-0.4SiS_2$ as the lithium ion inorganic solid electrolyte, various lithium ion conductive molded solid electrolytes were obtained by varying the composition ratio between the lithium ion conductive inorganic solid electrolyte and the H-SBR. The details are shown below.

Using the H-SBR and the lithium ion conductive inorganic solid electrolyte obtained in EXAMPLE 1, lithium ion conductive molded solid electrolytes with varying composition ratios were obtained by the same method as used in EXAMPLE 1.

Table 4 shows the composition ratio versus ionic conductivity relationships of the various lithium ion conductive molded solid electrolytes. Table 4 also shows the results of the bending test.

TABLE 4

| Ratio of H-SBR (% by weight) | 0.4 | 1.0 | 2.0 | 3.5 | 5.0 |
|---|---|---|---|---|---|
| Ratio of solid electrolyte (% by weight) | 99.6 | 99.0 | 98.0 | 96.5 | 95.0 |
| Ionic conductivity ($\times 10^{-4}$ S/cm) | — | — | — | — | 0.4 |
| Bendding test | Unable to recover as a molded article | Unable to recover as a molded article | Unable to recover as a molded article | Unable to recover as a molded article | Good |
| Remarks | Unable to recover as a molded article; hence unable to measure conductivity | | | | |

From the comparison between the EXAMPLES and the COMPARATIVE EXAMPLES, it can be seen that the hydrogenated block copolymer of the present invention having a crystalline block provides good workability and excellent flexibility and is a suitable material for obtaining a lithium ion conductive molded solid electrolyte having a high ionic conductivity.

EXAMPLE 13

In this example, a proton conducting molded solid electrolyte was produced by using silica gel doped with phosphoric acid as the proton conducting solid electrolyte and (H-1) as the hydrogenated block copolymer.

First, silica gel doped with phosphoric acid was synthesized in the following manner.

Tetraethoxysilane (hereinafter designated TEOS) was used as the starting material for synthesizing the silica gel, and was diluted with ethanol. Here, the mixing ratio of the TEOS to the ethanol was chosen to be 1:4 by mole. To this solution were added eight parts of pure water and 0.01 parts of tetraethylammonium tetrafluoroborate, the parts being by mole with respect to the TEOS, and was further added an aqueous solution of 3.6% by weight hydrochloric acid, with HCl being 0.01 parts by mole with respect to the TEOS, and the resulting mixture was stirred for five minutes. After that, an aqueous solution of 85% by weight phosphoric acid was added with the ratio $TEOS:H_3PO_4=1:0.5$, and the mixture was stirred in a hermetic container for three hours. The mixture was then left on stand for five hours for gelation, and heated for two hours at 150° C., to obtain the phosphoric acid doped silica gel.

The phosphoric acid doped silica gel obtained in the above process was pulverized and was stirred in a toluene solution of (H-1). Here, the ratio of the proton conducting solid electrolyte to the solid content of the (H-1) copolymer was chosen to be 19:1 by weight. The slurry thus obtained was applied onto a fluorocarbon resin plate by a doctor blade method, and was dried by allowing the toluene to evaporate under a reduced pressure at 100° C. After drying for three hours, the resulting sheet was separated from the fluoroplastic plate, to obtain the proton conducting molded solid electrolyte.

The ionic conductivity of the proton conducting molded solid electrolyte, when measured by the same AC impedance method as used in EXAMPLE 1, was $3.2\times10^{-3}$ S/cm.

In the bending test conducted in the same manner as in EXAMPLE 1, no externally discernible faults were observed, thus demonstrating that the proton conducting molded solid electrolyte according to this example had higher flexibility.

In this way, it has been found that a proton conducting molded solid electrolyte having high workability and high proton conductivity can be obtained according to the present invention using a proton conducting inorganic solid electrolyte and a hydrogenated block copolymer.

EXAMPLE 14

In this example, a silver ion conductive molded solid electrolyte was produced by using a solid electrolyte represented by $Ag_6I_4WO_4$ as the silver ion conductive solid electrolyte and (H-1) as the hydrogenated block copolymer.

First, $Ag_6I_4WO_4$ was synthesized in the following manner.

Silver iodide (AgI), silver oxide ($Ag_2O$), and tungsten oxide ($WO_3$) were used as starting materials. These starting materials were mixed together, and the mixture was heated and melted at 400° C. in a quartz crucible. Thereafter, the mixture was allowed to cool in the furnace, to obtain the silver ion conductive solid electrolyte represented by $Ag_6I_4WO_4$.

The silver ion conductive solid electrolyte obtained in the above process was pulverized and stirred in a toluene solution of (H-1). Here, the ratio of the silver ion conductive solid electrolyte to the solid content of the (H-1) copolymer was chosen to be 97:3 by weight. The slurry thus obtained was applied onto a fluorocarbon resin plate by a doctor blade method, and was dried by allowing the toluene to evaporate under a reduced pressure at 100° C. After drying for three hours, the resulting sheet was separated from the fluorocarbon resin plate, to obtain the silver ion conductive molded solid electrolyte.

The ionic conductivity of the silver ion conductive molded solid electrolyte and, for comparison purposes, the ionic conductivity of the silver ion conductive solid electrolyte before adding the hydrogenated block copolymer, were measured by the same AC impedance method as used in EXAMPLE 1. The result showed that the ionic conductivity of the silver ion conductive solid electrolyte itself was $4.0 \times 10^{-2}$ S/cm. On the other hand, after addition of the hydrogenated block copolymer, the ionic conductivity was $2.3 \times 10^{-2}$ S/cm, the rate of decrease relative to the former being held within one half.

In the bending test conducted in the same manner as in EXAMPLE 1, no externally discernible faults were observed, thus demonstrating that the silver ion conductive molded solid electrolyte according to this example had higher flexibility.

EXAMPLE 15

A molded electrode was obtained by using a lithiated cobalt oxide represented by $LiCoO_2$, which is an electron-lithium ion mixed conductor, as the material that exhibits an electrochemical oxidation reduction reaction in an electrolyte, and (H-1) as the hydrogenated block copolymer. The details are shown below.

First, $LiCoO_2$ was synthesized by measuring and mixing cobalt oxide ($Co_3O_4$) and lithium carbonate ($Li_2CO_3$) at a ratio of Co/Li=1, and by baking the mixture at 900° C. in the atmosphere.

Using the thus obtained $LiCoO_2$ and (H-1), a molded electrode was obtained in the following manner.

First, the $LiCoO_2$ obtained in the above process was pulverized to 350 mesh or finer powder. A toluene solution of (H-1) was then added to the powder of $LiCoO_2$, and thoroughly kneaded to obtain a slurry. The mixing ratio of the solid content of the hydrogenated block copolymer to the $LiCoO_2$ powder, when kneading, was chosen to be 5:95 by weight. The slurry thus obtained was applied onto a fluorocarbon resin plate by a doctor blade method, and was dried by allowing the toluene to evaporate under a reduced pressure at 100° C. After drying for three hours, by separating from the fluorocarbon resin plate and cutting out, a molded electrode with a diameter of 10 mm and a thickness of 0.2 mm was obtained.

For comparison purposes, using a water dispersion of polytetrafluoroethylene (hereinafter designated PTFE) in place of the hydrogenated block copolymer used in this example, a molded electrode was produced in like manner.

Further, for comparison purposes, a molded electrode was produced by pressure molding $LiCoO_2$ into the shape of a disk 10 mm in diameter and 0.2 mm in thickness, without adding a binder such as a hydrogenated block copolymer.

The electrochemical properties of the thus obtained molded electrodes were evaluated using the AC impedance method described below.

FIG. 1 shows in simplified form the construction of a measuring apparatus. In the figure, numeral 1 indicates a sample holder. The molded electrode 2 was set into the holder by pressing and adhering against a lead terminal 3, thus forming a test electrode. This test electrode was immersed into an electrolyte solution 4 in a container 7. The electrolyte solution was prepared by dissolving lithium phosphorus hexafluoride ($LiPF_6$) in the solvent mixture, which was obtained by mixing propylene carbonate and dimethoxy ethane in the ratio of 1:1 by volume, so as to provide a concentration of 1.0 M. A reference electrode 5 and a counter electrode 6 were each from a metallic lithium foil, and were immersed in the electrolyte solution. The measuring cell was thus formed. By applying an AC voltage of 10 mV to the measuring cell using an impedance analyzer, the AC impedance was measured over the frequency range of 100 kH to 1 mHz.

Figure 2:
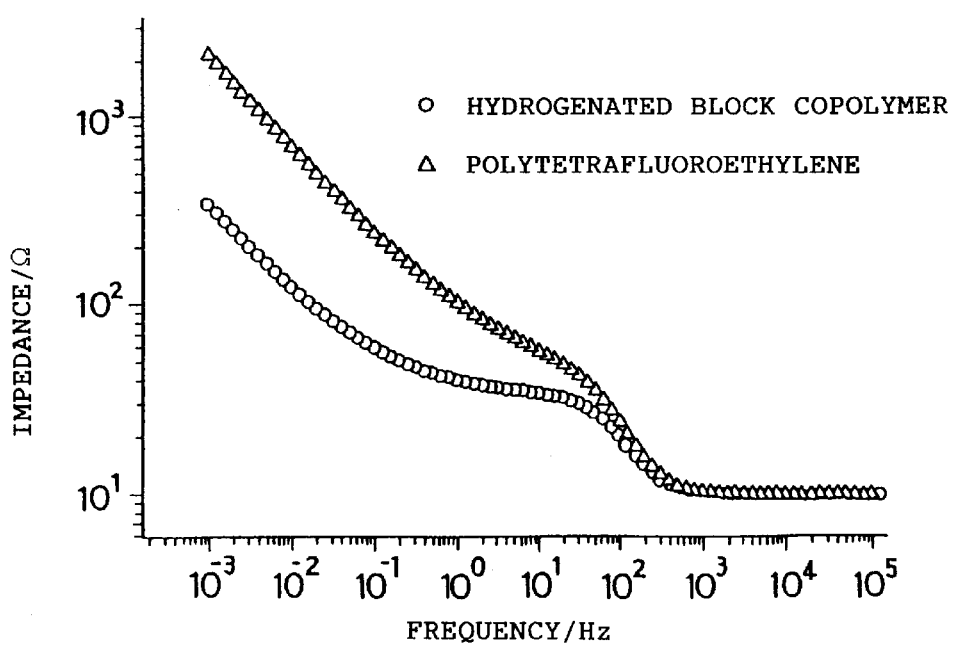
FIG. 2 is a diagram showing AC impedance spectra for the molded electrodes of the same example and a comparative example.

The results showed that in the case of the molded electrode produced without adding a binder, the formability of the electrode was inferior and, during the measurement, the electrode active material $LiCoO_2$ was dropped off into the electrolyte solution, making it impossible to measure the impedance. Impedance spectra for the electrode produced using the hydrogenated block copolymer of the present invention as the binder and the electrode produced using the PTFE in the comparative example were shown in FIG. 2. As can be seen from the figure, it was found that the molded electrode obtained by using the designated polymers of the present invention as the binder exhibited a low impedance value and achieved a high electrode reactivity.

As described above, it has been found that a molded electrode having a high electrode reactivity and excellent formability can be obtained according to the present invention.

EXAMPLE 16

Except that (H-1) used as the hydrogenated block copolymer in EXAMPLE 15 was replaced by (H-2), a molded electrode was obtained in the same manner as in EXAMPLE 15.

To evaluate the electrode characteristics of the molded electrode, the AC impedance was measured by the same method as used in EXAMPLE 15; the results showed that the impedance at 10 mHz was 310Ω, which was lower than that of the molded electrode of the comparative example in EXAMPLE 15 that used PTFE as the binder.

EXAMPLE 17

Except that (H-1) used as the hydrogenated block copolymer in EXAMPLE 15 was replaced by (H-3), a molded electrode was obtained in the same manner as in EXAMPLE 15.

To evaluate the electrode characteristics of the molded electrode, the AC impedance was measured by the same method as used in EXAMPLE 15; the results showed that the impedance at 10 mHz was 270Ω, which was lower than that of the molded electrode of the comparative example in EXAMPLE 15 that used PTFE as the binder.

EXAMPLE 18

Except that (H-1) used as the hydrogenated block copolymer in EXAMPLE 15 was replaced by (H-4), a molded electrode was obtained in the same manner as in EXAMPLE 15.

To evaluate the electrode characteristics of the molded electrode, the AC impedance was measured by the same method as used in EXAMPLE 15; the results showed that the impedance at 10 mHz was 420Ω, which was lower than that of the molded electrode of the comparative example in EXAMPLE 15 that used PTFE as the binder.

EXAMPLE 19

By using $LiNiO_2$ as the electron-lithium ion mixed conductor in place of the lithiated cobalt oxide represented by $LiCoO_2$ used in EXAMPLE 15, and using (H-2) as the hydrogenated block copolymer as in EXAMPLE 16, a molded electrode was produced. The details are shown below.

First, $LiNiO_2$ was synthesized by mixing together nickel oxide (NiO) and lithium hydroxide, and by heating the mixture at 800° C. in the atmosphere.

Next, the $LiNiO_2$ obtained in the above process was pulverized to 350 mesh or finer powder. Using this $LiNiO_2$ powder and a toluene solution of (H-2), the molded electrode was produced in the same manner as in EXAMPLE 15.

For comparison purposes, using a toluene solution of the block copolymer SEBS used in COMPARATIVE EXAMPLE 1 in place of the hydrogenated block copolymer used in the present example, a molded electrode was produced in like manner.

Further, for comparison purposes, a molded electrode was produced by pressure molding $LiNiO_2$ into the shape of a disk 10 mm in diameter and 0.2 mm in thickness, without adding a binder such as the designated polymers.

The electrochemical properties of the thus obtained molded electrodes were evaluated by the same AC impedance method as used in EXAMPLE 15.

The results showed that in the case of the molded electrode produced without adding a binder, the formability of the electrode was inferior and, during the measurement, the electrode active material $LiNiO_2$ was dropped off into the electrolyte solution, making it impossible to measure the impedance. The AC impedance of the electrode produced using the hydrogenated block copolymer of the present invention and that of the electrode produced using the SEBS in the comparative example were measured; the results showed that the impedance of the molded electrode produced using the hydrogenated block copolymer of the present invention as the binder was 450Ω at 10 mHz, whereas the impedance of the molded electrode produced using the SEBS in the comparative example was 740Ω, thus demonstrating that the molded electrode according to the present invention exhibited a lower impedance and achieved a higher electrode reactivity.

As described above, it has been found that a molded electrode having a high electrode reactivity and excellent formability can be obtained according to the present invention.

EXAMPLE 20

By using a lithiated manganese oxide represented by $LiMn_2O_4$ as the material that exhibits an electrochemical oxidation reduction reaction in a lithium ion conductive electrolyte and, as in EXAMPLE 16, using (H-2) as the hydrogenated block copolymer, a molded electrode was produced. The details are shown below.

$LiMn_2O_4$ was synthesized by mixing together lithium carbonate ($Li_2CO_3$) and manganese acetate ($Mn(CH_3COO)_2$), and by heating the mixture at 750° C. in the atmosphere.

Next, the $LiMn_2O_4$ obtained in the above process was pulverized to 350 mesh or finer powder. This $LiMn_2O_4$ powder and graphite powder as the electron conductive material were mixed at a ratio of 9:1 by weight. Further using a toluene solution of (H-2), the molded electrode was produced in the same manner as in EXAMPLE 15. Here, the mixing ratio of the solid content of the hydrogenated block copolymer to the $LiMn_2O_4$ powder, when kneading, was chosen to be 5:95 by weight.

For comparison purposes, using a water dispersion of PTFE in place of the hydrogenated block copolymer used in this example, a molded electrode was produced in like manner.

Further, for comparison purposes, a molded electrode was produced by pressure molding the mixture of the $LiMn_2O_4$ powder and graphite into the shape of a disk 10 mm in diameter and 0.2 mm in thickness, without adding a binder such as a hydrogenated block copolymer.

The electrochemical properties of the thus obtained molded electrodes were evaluated by the same AC impedance method as used in EXAMPLE 15.

The results showed that in the case of the molded electrode produced without adding a binder, the formability of the electrode was inferior and, during the measurement, the electrode active material $LiMn_2O_4$ was cast off into the electrolyte solution, making it impossible to measure the impedance. The AC impedance of the electrode produced using the hydrogenated block copolymer of the present invention as the binder and that of the electrode produced using the PTFE in the comparative example were measured; the results showed that the impedance of the molded electrode produced using the hydrogenated block copolymer of the present invention as the binder was 570Ω at 10 mHz, whereas the impedance of the molded electrode using the PTFE in the comparative example was 810Ω, thus demonstrating that the molded electrode of the present invention exhibited a lower impedance and achieved a higher electrode reactivity.

EXAMPLE 21

By using graphite fluoride as the material that exhibits an electrochemical oxidation reduction reaction in a lithium ion conductive electrolyte and, as in EXAMPLE 16, using (H-2) as the hydrogenated block copolymer, a molded electrode was produced. The details are shown below.

Graphite fluoride was synthesized by heating graphite powder at 600° C. in a fluorine gas.

Except that the graphite fluoride obtained in the above process was used in place of $LiMn_2O_4$, the molded electrode of the present invention and molded electrodes for comparison purposes were formed and their electrochemical properties examined in the same manner as in EXAMPLE 20.

The results showed that in the case of the molded electrode produced without adding a binder, the formability of the electrode was inferior and, during the measurement, the electrode active material of graphite fluoride was dropped off into the electrolyte solution, making it impossible to measure the impedance. The AC impedance of the molded electrode produced using the hydrogenated block copolymer of the present invention as the binder and that of the molded electrode produced using the PTFE in the comparative example were measured; the results showed that the impedance of the molded electrode produced using the hydrogenated block copolymer of the present invention as the binder was 770Ω at 10 mHz, whereas the impedance of the molded electrode produced using the PTFE in the comparative example was 890Ω, thus demonstrating that the molded electrode of the present invention exhibited a lower impedance and achieved a higher electrode reactivity.

EXAMPLE 22

Except that in place of $LiCoO_2$, natural graphite was used as the material that exhibits an electrochemical oxidation reduction reaction in a lithium ion conductive electrolyte, a molded electrode was produced and the electrode characteristics were examined in the same manner as in EXAMPLE 16.

The results showed that in the case of the molded electrode produced without adding a binder, the formability of the electrode was inferior and, during the measurement, the electrode active material of natural graphite was dropped off into the electrolyte solution, making it impossible to measure the impedance. The AC impedance of the molded electrode produced using the hydrogenated block copolymer of the present invention as the binder and that of the molded electrode produced using the PTFE in the comparative example were measured; the results showed that the impedance of the molded electrode produced using the hydrogenated block copolymer of the present invention as the binder was 370Ω at 10 mHz, whereas the impedance of the molded electrode produced using the PTFE in the comparative example was 520Ω, thus demonstrating that the molded electrode of the present invention exhibited a lower impedance and achieved a higher electrode reactivity.

EXAMPLE 23

By using the $LiCoO_2$ obtained in EXAMPLE 15 as the electron-lithium ion mixed conductor, the amorphous solid electrolyte $0.01Li_3PO_4$-$0.63Li_2S$-$0.36SiS_2$ obtained in EXAMPLE 5 as the lithium ion conductive inorganic solid electrolyte, and (H-2) as the hydrogenated block copolymer, a molded electrode was obtained. The details are shown below.

Using the solid electrolyte obtained in EXAMPLE 5, the $LiCoO_2$ obtained in EXAMPLE 15, and the hydrogenated block copolymer (H-2), the molded electrode was produced in the following manner.

First, the solid electrolyte obtained in the above process was pulverized to 350 mesh or finer powder. The power of the solid electrolyte, the powder of $LiCoO_2$, and a toluene solution of (H-2) were thoroughly kneaded to obtain a slurry. The mixing ratio of the solid content of the hydrogenated block copolymer, the solid electrolyte powder, and the $LiCoO_2$ powder, when kneading, were chosen to be 1:32:67 by weight. The slurry thus obtained was applied onto a fluorocarbon resin plate by a doctor blade method, and was dried by allowing the toluene to evaporate under a reduced pressure at 100° C. After drying for three hours, the resulting film was separated from the fluoroplastic plate, and cut out to obtain a molded electrode with a diameter of 10 mm and a thickness of 0.2 mm.

For comparison purposes, using a toluene solution of the SEBS used in COMPARATIVE EXAMPLE 1 in place of the hydrogenated block copolymer used in the present example, a molded electrode was produced in like manner.

Further, for comparison purposes, a molded electrode was produced by pressure molding the mixture of the $LiCoO_2$ and solid electrolyte into the shape of a disk 10 mm in diameter and 0.2 mm in thickness, without adding a binder such as a hydrogenated block copolymer.

The electrochemical properties of the thus obtained molded electrodes were evaluated using the AC impedance method described below.

Figure 3:
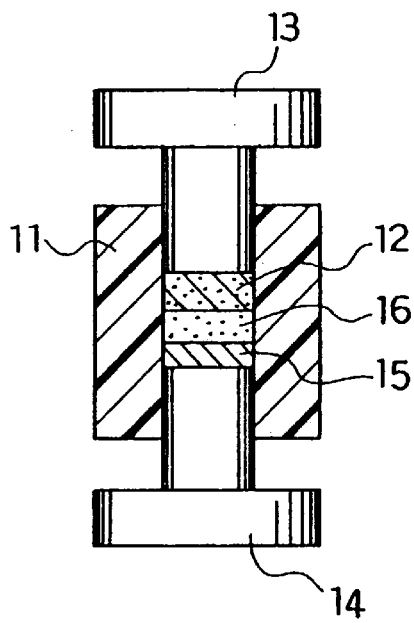
FIG. 3 is a vertical cross sectional view showing in simplified form the construction of an apparatus for evaluating the electrochemical properties of a molded electrode in another example of the present invention.
Figure 4:
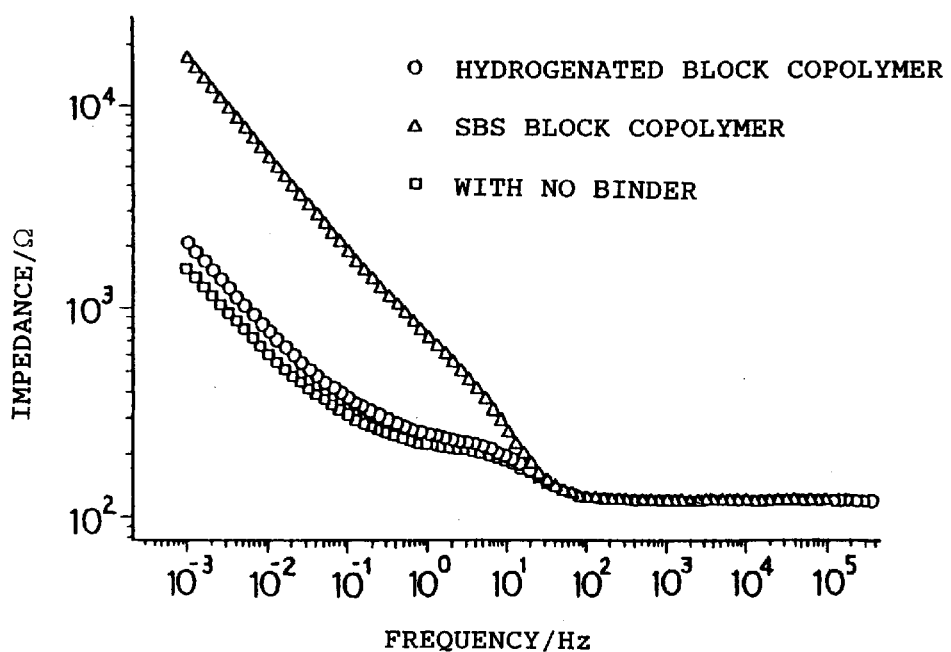
FIG. 4 is a diagram showing AC impedance spectra for the molded electrodes of the same example and comparative examples.

In FIG. 3, a simplified form the construction of a measuring apparatus is shown. In the figure, numeral 11 indicates a hollow sample holder made of polyethylene terephthalate. The molded electrode 12 was set into the holder with a lead terminal 13 pressed and adhered to the molded electrode 12, thus forming a test electrode. This test electrode and a counter electrode 15 formed from a metallic lithium foil pressed against a lead terminal 14 were integrally molded with the lithium ion conductive solid electrolyte 16 interposed therebetween, thus forming a measuring cell. By applying an AC voltage of 10 mV to the measuring cell using an impedance analyzer, the AC impedance was measured over the frequency range of 100 kH to 1 mHz.

The resulting impedance spectra are shown in FIG. 3. As can be seen from the figure, when the hydrogenated block copolymer of the present invention was used as the binder, the impedance was lower than that obtained when the SEBS was used as the binder, though the impedance was higher than that obtained when no binder was used; it was thus found that a molded electrode exhibiting a high electrode reactivity was obtained.

Next, the formability of these molded electrodes was evaluated by conducting a drop test. In the drop test, each molded electrode was dropped onto a marble plate from a height of 50 cm, and the condition of the molded electrode after dropping was observed.

The results showed that no faults were observed on the molded electrodes that used the hydrogenated block copolymer of the present invention or the SEBS as the binder, but that cracks were observed on the molded electrode that did not use any binder.

As described above, it has been found that a molded electrode having a high electrode reactivity and excellent formability can be obtained according to the present invention.

EXAMPLE 24

By using the $LiNiO_2$ obtained in EXAMPLE 19 as the electron-lithium ion mixed conductor, the amorphous solid electrolyte $0.05Li_2O$-$0.60Li_2S$-$0.35SiS_2$ obtained in EXAMPLE 6 as the lithium ion conductive inorganic solid electrolyte in place of the $0.01Li_3PO_4$-$0.63Li_2S$-$0.36SiS_2$ obtained in EXAMPLE 5, and (H-1) as the hydrogenated block copolymer, a molded electrode was obtained. The details are shown below.

Using the solid electrolyte obtained in EXAMPLE 6. the $LiNiO_2$ obtained in EXAMPLE 19, and the hydrogenated block copolymer (H-1), the molded electrode was produced in the same manner as in EXAMPLE 23.

Further, for comparison purposes, using a toluene solution of SEBS in place of the hydrogenated block copolymer used in the present example, a molded electrode was produced in like manner.

Also, for comparison purposes, without adding a binder such as a hydrogenated block copolymer, a molded electrode was produced by pressure molding the mixture of the $LiNiO_2$ and solid electrolyte into the shape of a disk 10 mm in diameter and 0.2 mm in thickness.

The electrochemical properties of the thus obtained molded electrodes were evaluated using the same AC impedance method as in EXAMPLE 23. The results showed that the impedance of the molded electrode that used the hydrogenated block copolymer of the present invention as the binder was $3.3 \times 10^3 \Omega$ at 10 mHz. On the other hand, the impedance of the molded electrode that did not use any binder was $1.7 \times 10^3 \Omega$, and the impedance of the molded electrode that used SEBS as the binder was $5.4 \times 10^3 \Omega$. While the molded electrode of the present example exhibited a higher value than the molded electrode that did not use any binder, it exhibited a lower value than the molded electrode that used SEBS as the binder; it was thus found that a molded electrode exhibiting a high electrode reactivity was obtained.

Next, when the formability of these molded electrodes was evaluated using the same method as in EXAMPLE 23, no faults were observed on the molded electrodes that used the hydrogenated block copolymer of the present invention or the SEBS as the binder, but cracks were observed on the molded electrode that did not use any binder.

EXAMPLE 25

Except that the amorphous solid electrolyte $0.01Li_3PO_4$-$0.63Li_2S$-$0.36SiS_2$ used in EXAMPLE 23 as the lithium ion conductive inorganic solid electrolyte was replaced by a crystalline lithium ion conductive solid electrolyte represented by $Li_{1.3}Al_{0.3}Ti_{1.7}(PO_4)_3$, a molded electrode was produced in the same manner as in EXAMPLE 23. The details are shown below.

As the starting materials for the solid electrolyte, lithium carbonate, aluminum oxide, titanium oxide, and orthophosphoric acid were used. These starting materials were mixed together, and pressure molded into the form of a pellet, which was then sintered for 24 hours at 1300° C. to obtain the crystalline lithium ion conductive inorganic solid electrolyte represented by $Li_{1.3}Al_{0.3}Ti_{1.7}(PO_4)_3$.

Except that the solid electrolyte thus obtained was used in place of the amorphous solid electrolyte represented by $0.01Li_3PO_4$-$0.63Li_2S$-$0.36SiS_2$, the molded electrode was produced in the same manner as in EXAMPLE 23.

Further, for comparison purposes, using a water dispersion of PTFE in place of the hydrogenated block copolymer used in the present example, a molded electrode was produced in like manner.

The electrochemical properties of the thus obtained molded electrodes were evaluated using the same AC impedance method as in EXAMPLE 23. The results showed that the impedance of the molded electrode that used the hydrogenated block copolymer was $2.8 \times 10^3 \Omega$ at 10 mHz, whereas the impedance of the molded electrode that used PTFE was $4.8 \times 10^3 \Omega$. From the above results, it was found that the molded electrode that used the hydrogenated block copolymer of the present invention as the binder exhibited a lower impedance.

Next, when the formability of these molded electrodes was evaluated using the same method as in EXAMPLE 23, the results showed that no damage was caused to the molded electrodes that used the hydrogenated block copolymer of the present invention or the PTFE as the binder.

As described above, it has been found that a molded electrode having a high electrode reactivity and excellent formability can be obtained according to the present invention.

EXAMPLE 26

By using the lithiated cobalt oxide $LiCoO_2$ used in EXAMPLE 15 as the electron-lithium ion mixed conductor and (H-2) as the hydrogenated block copolymer, and also using a polyethylene mesh as the structural member, a molded electrode was obtained. The details are shown below.

The slurry containing the $LiCoO_2$ and hydrogenated block copolymer was obtained in the same manner as in EXAMPLE 15. Next, using a doctor blade method, the slurry was charged into the openings in the polyethylene mesh having a porosity of 70%. After that, the mesh was dried by allowing the toluene to evaporate under a reduced pressure at 120° C., thus obtaining the molded electrode.

When the AC impedance of the molded electrode was measured in the same manner as in EXAMPLE 15, the molded electrode exhibited almost the same impedance as the molded electrode obtained in EXAMPLE 15.

Next, a bending test was conducted to examine the flexibility of the molded electrode and evaluate the formability. The bending test was carried out by winding the molded electrode around a 40-mm diameter stainless steel rod and visually inspecting the condition of the electrode. The result showed that no externally discernible faults were observed on the molded electrode of this example, thus demonstrating that the electrode had high flexibility. On the other hand, when the same bending test was conducted on the molded electrode obtained in EXAMPLE 15, cracks were caused on the electrode.

As described above, it has been found that a molded electrode having particularly high formability and high electrochemical reactivity characteristics is obtained according to the present invention using a hydrogenated block copolymer and a material that exhibits an electrochemical oxidation reduction reaction in a lithium ion conductive electrolyte, and also using a structural member.

EXAMPLE 27

Except that the $LiCoO_2$ used in EXAMPLE 26 as the electron-lithium ion mixed conductor was replaced by the $LiNiO_2$ obtained in EXAMPLE 19, and that the polyethylene mesh used in EXAMPLE 26 as the structural member was replaced by a stainless steel mesh as an electron conducting structural member, while using (H-2) as the hydrogenated block copolymer as in EXAMPLE 26, a molded electrode was produced in the same manner as in EXAMPLE 26.

The AC impedance of the molded electrode, when measured in the same manner as in EXAMPLE 15, was $390 \Omega$.

which was lower than the impedance of the molded electrode obtained in EXAMPLE 19.

Next, a bending test was conducted to examine the flexibility of the molded electrode and evaluate the formability. The bending test was carried out by winding the molded electrode around a 40-mm diameter stainless steel rod and visually inspecting the condition of the electrode. The result showed that no externally discernible faults were observed on the molded electrode of this example, thus demonstrating that the electrode had high flexibility.

EXAMPLE 28

By using the molded electrode obtained in EXAMPLE 15 as the cathode and the molded electrode obtained in EXAMPLE 22 as the anode, and also using, as the lithium ion conductive electrolyte, a lithium ion conductive electrolyte comprising a lithium phosphorus hexafluoride (LiPF$_6$) dissolved in a solvent mixture of propylene carbonate and dimethoxy ethane, a lithium cell was obtained. The details are shown below.

First, a molded cathode and an molded anode were obtained by cutting out the molded electrode obtained in EXAMPLE 15 and the molded electrode obtained in EXAMPLE 22, respectively.

The lithium ion conductive liquid electrolyte was prepared by mixing propylene carbonate and dimethoxy ethane in ratio of 1:1 by volume, and by dissolving lithium phosphorus hexafluoride in the solvent mixture so as to provide a concentration of 1.0 M.

Figure 5:
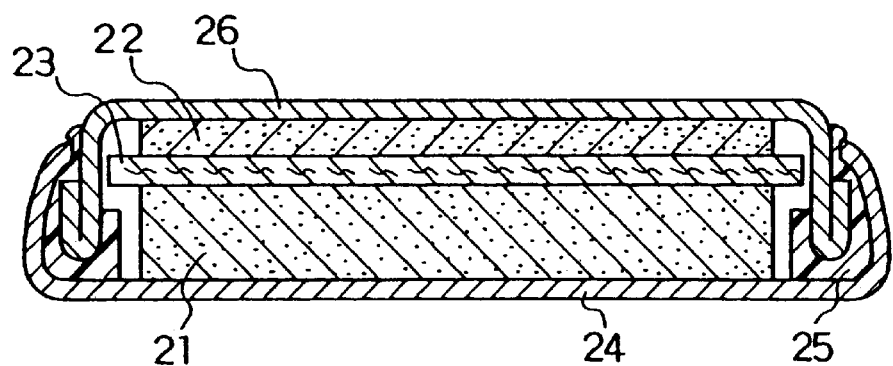
FIG. 5 is a vertical cross sectional view of a lithium cell according to still another example of the present invention.

A lithium cell having the cross section shown in FIG. 5 was fabricated by using the molded cathode, the molded anode, a porous polyethylene separator interposed therebetween, and the lithium ion conductive electrolyte. In FIG. 5, numeral 21 indicates the molded cathode disposed in the center of a cell case 24. On top of the molded cathode 21, the separator 23 and the moldedd anode 22 were arranged, and the lithium ion conductive electrolyte was dropped thereon; after that, a cell lid 26 was fitted to seal the entire construction with a gasket 25.

For comparison purposes, by replacing the molded cathode and molded anode used in the present example with the molded cathode and molded anode produced for comparison purposes in EXAMPLE 15 and EXAMPLE 22 using PTFE as the binder, a lithium cell was fabricated.

Further, for comparison purposes, using a polymer solid electrolyte as the binder in place of the hydrogenated block copolymer, a lithium cell was fabricated in the following manner.

For the polymer solid electrolyte, a lithium perchlorate (LiClO$_4$)/polyethylene oxide (PEO) system was used. First, polyethylene oxide (hereinafter designated PEO) was dissolved in acetonitrile, and then LiClO$_4$ was dissolved. Here, the mixing ratio of PEO and LiClO$_4$ was chosen so that the ratio of the lithium in LiClO$_4$ to the oxygen in PEO would become 1/50. Except that the thus prepared solution was used, the lithium cell was fabricated in the same manner as first described.

The lithium cells thus fabricated were charged up to 4.2 V with a current of 1 mA. After charging, the internal impedances of the cells were measured by an AC impedance method (with an applied AC voltage of 10 mV and an AC frequency of 1 Hz), after which a charge/discharge test was conducted within a voltage range of 3.0 V to 4.2 V with a current of 1 mA.

As the result of the testing, abnormality was observed in the charge curve during cell charging for the lithium cell that used the polymer solid electrolyte. When the cell was disassembled to investigate the cause, neither the cathode nor the anode retained their original shape, with each electrode being swollen remarkably that the current collectivity of the active material was lost. This was presumably because the polymer solid electrolyte was dissolved in the electrolyte and the formability of the electrodes was lost.

Figure 6:
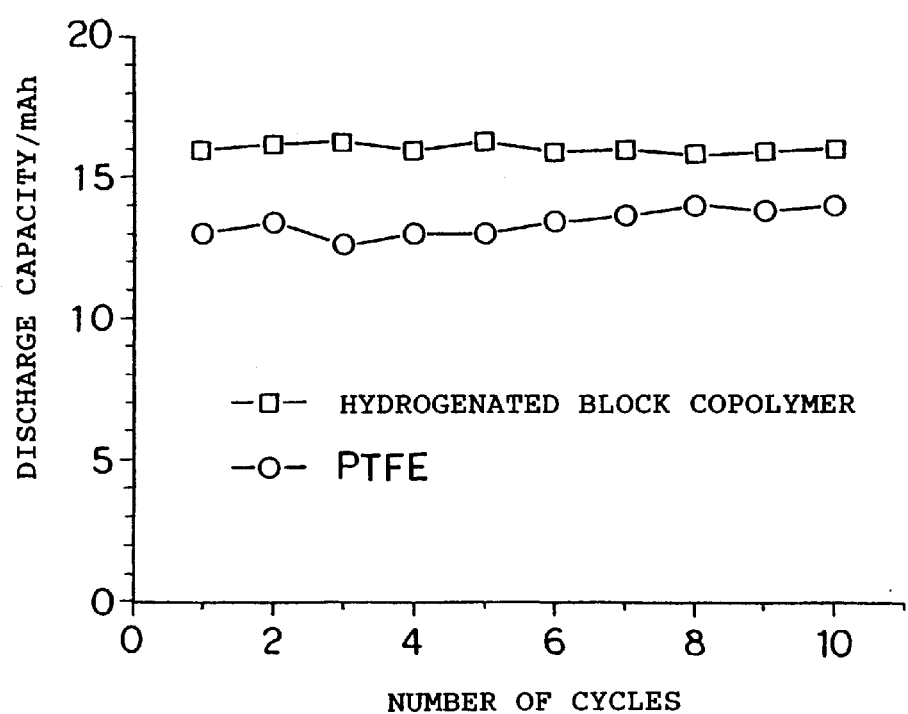
FIG. 6 is a diagram showing the charge/discharge cycle characteristics of the lithium cells of the same example and a comparative example.

For the lithium cell that used the hydrogenated block copolymer of the present invention as the binder and the lithium cell that used PTFE as the binder, the cell internal impedances obtained from the above test and the discharge capacity for each charge/discharge cycle are shown in Table 5 and FIG. 6, respectively. In either lithium cell, there was observed no decrease in discharge capacity associated with charge/discharge cycles, but it was shown that the lithium cell that used the hydrogenated block copolymer of the present invention exhibited a lower internal impedance and had a larger discharge capacity.

As described above, it has been found that according to the present invention, the formability of the electrodes can be improved without significantly impairing the internal ion conductivity of the cell, and thus a lithium cell exhibiting excellent cell characteristics can be obtained.

TABLE 5

| Cell | Internal Impedance ($\Omega$) |
| --- | --- |
| Uses hydrogenated block copolymer | 62 |
| Uses PTFE | 102 |

EXAMPLE 29

Except that the molded electrode obtained in EXAMPLE 16 was used as the molded cathode, a lithium cell according to the present invention was fabricated and the characteristics thereof was evaluated in the same manner as in EXAMPLE 28.

As the result, the lithium cell constructed by adding the hydrogenated block copolymer according to the present invention showed a discharge capacity of 14 mAh or higher and an internal impedance of 64$\Omega$, achieving a higher discharge capacity and lower internal impedance than the lithium cell constructed in EXAMPLE 28 for comparison purposes using PTFE as the binder.

EXAMPLE 30

Except that the molded electrode obtained in EXAMPLE 19 was used as the molded cathode, a lithium cell according to the present invention was fabricated and the characteristics thereof was evaluated in the same manner as in EXAMPLE 28.

Further, for comparison purposes, a lithium cell was fabricated by using as the cathode the molded electrode of the comparative example produced in EXAMPLE 19 using SEBS as the binder, and the cell characteristics were evaluated.

As the result, the lithium cell constructed by adding the hydrogenated block copolymer according to the present invention showed a discharge capacity of 18 mAh and an internal impedance of 87$\Omega$. On the other hand, the lithium cell of the comparative example constructed using SEBS as the binder showed a discharge capacity of 16 mAh and an internal impedance of 98$\Omega$, and thus the lithium cell of the present invention showed a higher discharge capacity and lower internal impedance.

EXAMPLE 31

By using a molded electrode produced in the same manner as in EXAMPLE 15 except that titanium disulfide represented by $TiS_2$ was used as the cathode active material in place of the lithiated cobalt oxide represented by $LiCoO_2$, and also using metallic lithium as the anode active material in place of the natural graphite used in EXAMPLE 29, a lithium cell was fabricated. The details are shown below.

First, $TiS_2$ was synthesized by a CVD process from metallic titanium and sulfur.

Next, the $TiS_2$ obtained in the above process was pulverized to 350 mesh or finer powder. Using this $TiS_2$ powder in place of the $LiCoO_2$ powder, the molded electrode was produced in the same manner as in EXAMPLE 15. Except that the molded electrode obtained in the above process was used for the cathode and the metallic lithium foil for the anode, the lithium cell according to the present invention was fabricated in the same manner as in EXAMPLE 29. For comparison purposes, a lithium cell was fabricated by using PTFE in place of the hydrogenated block copolymer (H-1).

The lithium cells thus fabricated were discharged down to 1.8 V with a current of 500 $\mu A$. After discharging, the internal impedances of the cells were measured by an AC impedance method (with an applied AC voltage of 10 mV and an AC frequency of 1 Hz), after which a charge/discharge test was conducted within a voltage range of 1.8 V to 2.8 V with a current of 500 $\mu A$.

As the result, the lithium cell that used the hydrogenated block copolymer of the present invention showed a discharge electrical quantity of 28 mAh and an internal impedance of 74$\Omega$. On the other hand, the cell that used PTFE showed a discharge electrical quantity of 23 mAh and an internal impedance of 86$\Omega$. From these results, it was found that the cell of the present invention had a lower internal impedance and larger discharge capacity.

EXAMPLE 32

Except that the molded electrode obtained in EXAMPLE 20 was used as the cathode, a lithium cell was fabricated in the same manner as in EXAMPLE 29.

For comparison purposes, except that the molded electrode of the comparative example produced in EXAMPLE 16 using PTFE as the binder was used as the cathode, a lithium cell was fabricated and its characteristics evaluated in the same manner as above.

As the result, the lithium cell that used the hydrogenated block copolymer of the present invention showed a discharge capacity of 11 mAh and an internal impedance of 230$\Omega$. On the other hand, the cell that used PTFE showed a discharge capacity of 8.5 mAh and an internal impedance of 340$\Omega$. From these results, it was found that the cell of the present invention had a lower internal impedance and larger discharge capacity.

EXAMPLE 33

Except that an electrolyte comprising $LiClO_4$ dissolved in a solvent mixture of propylene carbonate and dimethoxy ethane was used as the lithium ion conductive electrolyte, a lithium cell according to the present invention and a lithium cell for comparison purposes were fabricated in the same manner as in EXAMPLE 29.

As the result, the discharge capacity and internal impedance of the lithium cell that used the hydrogenated block copolymer of the present invention were 13 mAh and 67$\Omega$, respectively, whereas those for the cell that used PTFE were 11 mAh and 71$\Omega$, respectively.

EXAMPLE 34

Except that the molded electrode produced in EXAMPLE 27 using the stainless steel mesh for increased formability of the electrode was used as the cathode, and that an molded anode using a stainless steel mesh, hereinafter described, was used as the anode, a lithium cell was fabricated in the same manner as in EXAMPLE 28.

The molded anode was produced by charging the slurry containing natural graphite and (H-2), obtained in EXAMPLE 22, into a stainless steel mesh, and by allowing the toluene to evaporate under a reduced pressure at 100° C.

Using the thus produced molded anode and the molded electrode obtained in EXAMPLE 27 as the cathode, the lithium cell was fabricated in the same manner as in EXAMPLE 28.

When the characteristics of the thus fabricated lithium cell were evaluated in the same manner as in EXAMPLE 28, there was observed no decrease in discharge capacity associated with charge/discharge cycles, and the discharge capacity and internal impedance of the lithium cell that used the structural member obtained in the present example were 17 mAh and 51$\Omega$, respectively, showing that the cell fabricated in this example had a lower internal impedance and larger discharge capacity.

EXAMPLE 35

In EXAMPLES 28 to 34, there were explained the examples wherein a lithium cell was constructed as the electrochemical device, but in this example, an example wherein a nickel-cadmium cell was constructed as the electrochemical device.

First, a molded electrode used for the anode was produced in the following manner.

A powder of cadmium oxide and a toluene solution of the hydrogenated block copolymer (H-2) were mixed together by maintaining the ratio of the cadmium oxide to the copolymer at 95:5 by weight. The slurry thus prepared was applied on and charged in a nickel plated iron punching metal as an electron conductive structural member, and the toluene was evaporated at 100° C. to obtain the molded electrode.

Next, a molded electrode used for the cathode was produced in the following manner.

Nickel hydroxide, metallic cobalt powder, and a toluene solution of (H-2) were mixed together to produce a mixture of the nickel hydroxide, metallic cobalt, and copolymer in proportions of 90:5:5 by weight. The slurry thus prepared was charged into a nickel foam as an electron conductive structural member, and the toluene was evaporated at 100° C. to obtain the molded electrode.

By using the thus obtained cathode and anode, and also using a polyamide fiber unwoven fabric as the separator and a 7N KOH aqueous solution as the electrolyte, The nickel-cadmium cell was fabricated.

When the charge/discharge performance and rate characteristics of the thus fabricated nickel-cadmium cell were examined, the results were comparable to those of conventional cells.

As described above, it has been found that the hydrogenated block copolymer is also applicable as a binder for electrochemical devices using liquid electrolyte.

EXAMPLE 36

By using (H-1) as the hydrogenated block copolymer, a lithiated cobalt oxide represented by $LiCoO_2$ as the cathode active material, indium as the anode active material, and an amorphous solid electrolyte represented by $0.01Li_3PO_4$-$0.63Li_2S$-$0.36SiS_2$ as the lithium ion conductive electrolyte, an all-solid lithium cell was obtained. The details are shown below.

The lithium ion conductive solid electrolyte used here was the same as that obtained in EXAMPLE 5, and $LiCoO_2$ was the same as that obtained in EXAMPLE 15. Further, the same molded solid electrolyte as obtained in EXAMPLE 5 and the same molded electrode as obtained in EXAMPLE 23 were used here.

Using the lithium ion conductive solid electrolyte, $LiCoO_2$, and molded electrode described above, the all-solid lithium cell was fabricated in the following manner.

Figure 7:
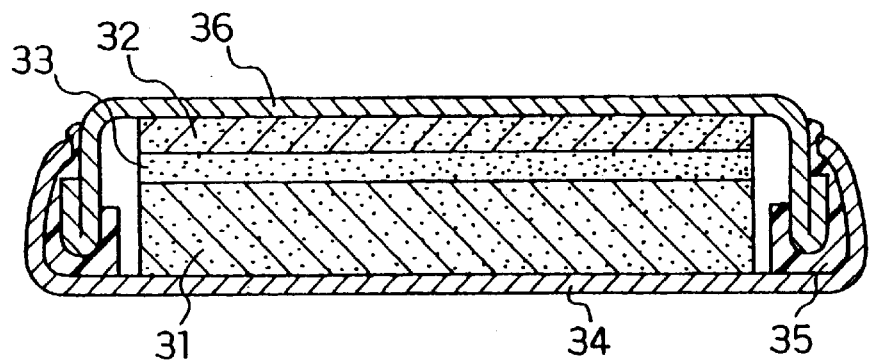
FIG. 7 is a vertical cross sectional view of an all-solid lithium cell according to yet another example of the present invention.

First, for comparison purposes, a solid electrolyte layer and a cathode layer were formed by a powder molding method using a lithium ion conductive solid electrolyte and a cathode material, neither containing a hydrogenated block copolymer, and an all-solid lithium cell A having the cross section shown in FIG. 7 was thus fabricated. In FIG. 7, numeral 31 indicates the cathode, 33 the lithium ion conductive solid electrolyte layer, and 32 the anode formed from a metallic indium foil; these constituent elements were integrally pressure molded. The integrally pressure molded pellet was placed in a stainless steel cell case 34, and was sealed therein by fitting a stainless steel lid 36 with an insulating gasket 35.

Next, except that the above lithium ion conductive solid electrolyte powder was replaced by the lithium ion conductive molded solid electrolyte obtained in EXAMPLE 5, a lithium cell B according to the present invention was fabricated in the same manner as above.

Further, except that the cathode used in the lithium cell A was replaced by the molded electrode obtained in EXAMPLE 23, a lithium cell C according to the present invention was fabricated in the same manner as the lithium cell A.

Further, except that the lithium ion conductive solid electrolyte powder and the cathode material used in the lithium cell A were replaced by the lithium ion conductive molded solid electrolyte and the molded electrode, respectively, a lithium cell D according to the present invention was fabricated in the same manner as the lithium cell A.

Next, for comparison purposes, by using an isoprene-styrene random copolymer in place of the hydrogenated block copolymer used in the present example, and also using the molded solid electrolyte obtained in the same manner as in EXAMPLE 5 and/or the molded electrode obtained in the same manner as in EXAMPLE 23, a lithium cell E (with its solid electrolyte layer formed from the molded solid electrolyte), a lithium cell F (with its cathode layer formed from the molded electrode), and a lithium cell G (with its solid electrolyte layer and cathode layer formed from the molded solid electrolyte and the molded electrode, respectively) were fabricated in like manner.

The lithium cells thus fabricated were charged up to 3.7 V with a current of 300 $\mu$A. After charging, the internal impedances of the cells were measured by an AC impedance method (with an applied AC voltage of 10 mV and an AC frequency of 1 Hz), after which a charge/discharge test was conducted within a voltage range of 2.0 V to 3.8 V with a current of 300 $\mu$A.

Figure 8:
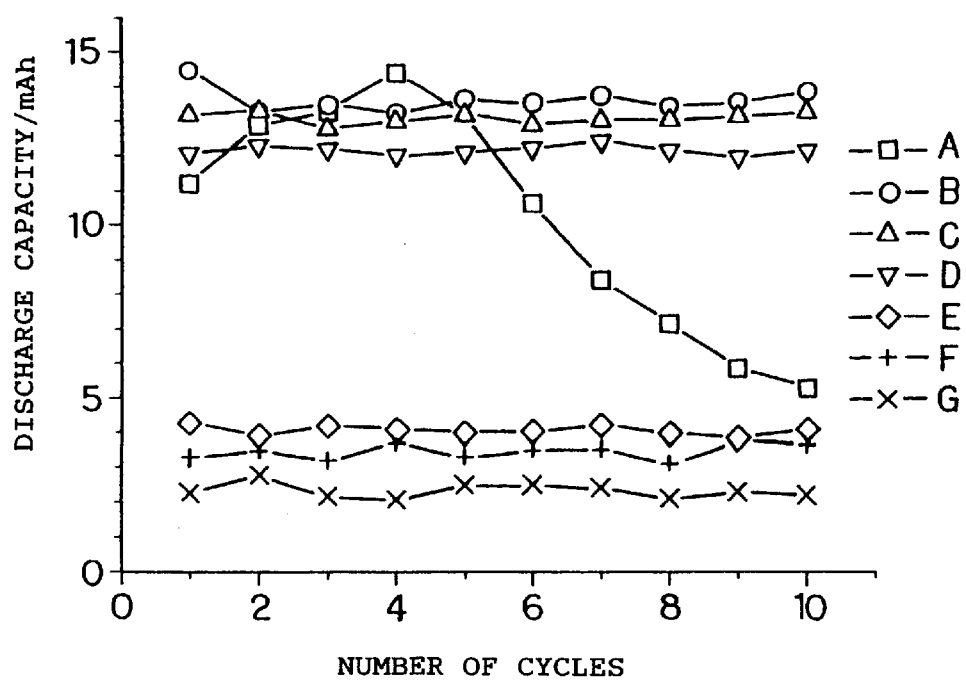
FIG. 8 is a diagram showing the charge/discharge cycle characteristics of the all-solid lithium cells of the same example and comparative examples.

The internal impedances measured on the respective cells and the discharge capacity for each charge/discharge cycle are shown in Table 6 and FIG. 8, respectively. For the lithium cells B, C, and D according to the present invention, there was observed almost no decrease in discharge capacity associated with charge/discharge cycles, though the internal impedance was higher than that of the lithium cell A. On the other hand, in the case of the lithium battery A fabricated without adding the hydrogenated block copolymer, the decrease in capacity associated with charge/discharge cycles was particularly noticeable. When the cross section thereof was observed by an X-ray CT to investigate the cause, cracks were observed on the pellet inside the cell, and it is regarded that the capacity dropped presumably because of the deterioration of the cell internal bonding condition caused by electrode volumetric changes associated with charging and discharging operations.

In the case of the lithium cells E, F, and G that used the isoprene-styrene random copolymer as the binder for the solid electrolyte layer and/or the molded electrode, their internal impedances after charging showed large values, and their discharge capacities were small though the decrease associated with charge/discharge cycles was small. This was presumably because the added polymers interfered with the internal ion conductivity of the cell, as a result of which the internal impedance of the cell increased, increasing the overvoltage during discharging and thus decreasing the discharge capacity.

As described above, it has been found that according to the present invention, an all-solid lithium cell can be obtained that achieves excellent charge/discharge cycle characteristics by preventing the deterioration of the cell internal bonding property associated with electrode volumetric changes during charging and discharging operations, without significantly impairing the internal ion conductivity of the cell.

TABLE 6

| | Internal impedance ($\Omega$) |
|---|---|
| Cell A | 340 |
| Cell B | 470 |
| Cell C | 610 |
| Cell D | 740 |
| Cell E | 2500 |
| Cell F | 3100 |
| Cell G | 3800 |

EXAMPLE 37

Except that the molded electrode used in EXAMPLE 36 as the cathode was replaced by the molded electrode obtained in EXAMPLE 24, and that the molded solid electrolyte used in EXAMPLE 36 as the solid electrolyte layer was replaced by the molded solid electrolyte obtained in EXAMPLE 6, an all-solid lithium cell I (with its solid electrolyte layer formed from the molded solid electrolyte), lithium cell J (with its cathode layer formed from the molded electrode), and lithium cell K (with its solid electrolyte layer and cathode layer formed from the molded solid electrolyte and the molded electrode, respectively) according to the present invention were fabricated and their characteristics evaluated in the same manner as in EXAMPLE 36.

Further, without using a hydrogenated block copolymer for either layer, an all-solid lithium cell H was fabricated in which the solid electrolyte layer and the cathode layer were formed by a powder molding method using an electrolyte and a cathode material.

For comparison purposes, by using as the molded electrode the molded electrode of the comparative example produced in EXAMPLE 24 using SEBS as the binder, and using a molded solid electrolyte containing 3.5% by weight of SEBS, an all-solid lithium cell L (with its solid electrolyte layer formed from the molded solid electrolyte), lithium cell M (with its cathode layer formed from the molded electrode), and lithium cell N (with its solid electrolyte layer and cathode layer formed from the molded solid electrolyte and the molded electrode, respectively) were fabricated.

As can be seen from the results shown in Table 7, for the lithium cells I, J, and K according to the present invention, there was observed almost no decrease in discharge capacity associated with charge/discharge cycles, though the internal impedance was higher than that of the lithium cell H. On the other hand, in the case of the lithium battery H fabricated without adding the hydrogenated block copolymer, the decrease in capacity associated with charge/discharge cycles was particularly noticeable. When the cross section thereof was observed by an X-ray CT to investigate the cause, cracks were observed on the pellet inside the cell, and the capacity dropped presumably because of the deterioration of the cell internal bonding condition caused by electrode volumetric changes associated with charging and discharging operations. In the case of the lithium cells L, M, and N that used SEBS, their internal impedances after charging showed large values, and their discharge capacities were small though the decrease associated with charge/discharge cycles was small. This was presumably because the added polymers interfered with the internal ion conductivity of the cell, as a result of which the internal impedance of the cell increased, increasing the overvoltage during discharging and thus decreasing the discharge capacity.

TABLE 7

| | Internal impedance (Ω) |
|---|---|
| Cell H | 430 |
| Cell I | 570 |
| Cell J | 690 |
| Cell K | 800 |
| Cell L | 2800 |
| Cell M | 3300 |
| Cell N | 3900 |

EXAMPLE 38

By using the titanium disulfide represented by $TiS_2$ obtained in EXAMPLE 31 as the cathode active material in place of the lithiated cobalt oxide represented by $LiCoO_2$ used in EXAMPLE 36, metallic lithium as the anode active material in place of the indium used in EXAMPLE 36, and (H-2) as the hydrogenated block copolymer, an all-solid lithium cell was fabricated. The details are shown below.

First, the $TiS_2$ obtained in EXAMPLE 31 was pulverized to 350 mesh or finer powder. Except that this $TiS_2$ powder was used in place of the $LiCoO_2$ powder, the molded electrode was produced in the same manner as in EXAMPLE 23. By using the molded electrode and metallic lithium foil, the lithium cell according to the present invention was fabricated. For comparison purposes, a lithium cell that did not use any hydrogenated block copolymer and a lithium cell that used SEBS in place of the hydrogenated block copolymer were also fabricated.

The lithium cells thus fabricated were discharged down to 1.8 V with a current of 100 µA. After discharging, the internal impedances of the cells were measured by an AC impedance method (with an applied AC voltage of 10 mV and an AC frequency of 1 Hz), after which a charge/discharge test was conducted within a voltage range of 1.8 V to 2.8 V with a current of 100 µA.

As the result, while the lithium cell of the present invention in which the hydrogenated block copolymer was added to either the solid electrolyte layer or the cathode layer showed a slightly higher internal impedance than the lithium cell fabricated without adding any hydrogenated block copolymer, the internal impedance was held to 1 k Ω or lower, and there was observed almost no decrease in discharge capacity associated with charge/discharge cycles. In the case of the lithium cell that used SEBS as the binder, on the other hand, the internal impedance after charging showed 2 k Ω or higher value. Furthermore, though the decrease associated with charge/discharge cycles was small, the discharge capacity was also small.

EXAMPLE 39

Except that for the cathode the lithiated manganese oxide represented by $LiMn_2O_4$ obtained in EXAMPLE 20 was used in place of the lithiated cobalt oxide represented by $LiCoO_2$ used in EXAMPLE 36, an all-solid lithium cell was fabricated in the same manner as in EXAMPLE 36. The details are shown below.

First, the $LiMn_2O_4$ obtained in EXAMPLE 20 was pulverized to 350 mesh or finer powder. The cathode material was prepared by mixing the $LiMn_2O_4$ powder, the solid electrolyte powder obtained in EXAMPLE 5, and graphite powder as an electron conductive material in proportions of 6:3:1 by weight.

Except that the above cathode material was used, and using the thus produced molded electrode, the lithium cell was fabricated, the molded electrode was produced in the same manner as in EXAMPLE 23.

For comparison purposes, a lithium cell that did not use any hydrogenated block copolymer and a lithium cell that used SEBS in place of the hydrogenated block copolymer were fabricated and their characteristics were evaluated.

As the result, while the lithium cell of the present invention in which the hydrogenated block copolymer was added to either the solid electrolyte layer or the cathode layer showed a slightly higher internal impedance than the lithium cell fabricated without adding any hydrogenated block copolymer, the internal impedance was held to 1 k Ω or lower, and there was observed almost no decrease in discharge capacity associated with charge/discharge cycles. In the case of the lithium cell that used SEBS, on the other hand, the internal impedance after charging showed 2 k Ω or higher value, and though the decrease associated with charge/discharge cycles was small, the discharge capacity was also small.

EXAMPLE 40

Except that a molded electrode formed from natural graphite was used as the anode material in place of the indium used in EXAMPLE 36, an all-solid lithium cell according to the present invention was fabricated in the same manner as in EXAMPLE 36. The details are shown below.

The anode material was prepared by mixing natural graphite and the lithium ion conductive solid electrolyte obtained in EXAMPLE 36 in proportions of 9:1 by weight. Using this anode material, the molded electrode was produced in the same manner as in EXAMPLE 23.

Using the molded anode thus produced, the molded cathode obtained in EXAMPLE 23, and the lithium ion conductive molded solid electrolyte obtained in EXAMPLE 5, the lithium cell was fabricated in the same manner as in EXAMPLE 36.

For comparison purposes, a lithium cell was fabricated without adding a hydrogenated block copolymer.

The lithium cells thus fabricated were charged up to 4.2 V with a current of 300 µA. After charging, the internal impedances of the cells were measured by an AC impedance method (with an applied AC voltage of 10 mV and an AC frequency of 1 Hz), after which a charge/discharge test was conducted within a voltage range of 2.5 V to 4.2 V with a current of 300 µA.

As the result, while the lithium cell of the present invention fabricated by adding the hydrogenated block copolymer showed a slightly higher internal impedance than the lithium cell fabricated without adding any hydrogenated block copolymer, the internal impedance was held to 1 k Ω or lower, and there was observed almost no decrease in discharge capacity associated with charge/discharge cycles.

EXAMPLE 41

By using the same cathode material, anode material, and electrolyte as used in the lithium cell C in EXAMPLE 36, and also using a stainless steel mesh to improve the formability of the cathode, a lithium cell was fabricated.

First, a slurry was prepared that contained $LiCoO_2$ and $0.01Li_3PO_4$-$0.63Li_2S$-$0.36SiS_2$ used in EXAMPLE 36 as the cathode active material and solid electrolyte and (H-2) as the hydrogenated block copolymer. Next, using a doctor blade method, the slurry was charged into the openings in the stainless steel mesh having a porosity of 80% and serving as the structural member. After that, the mesh was dried by allowing the toluene to evaporate under a reduced pressure at 100° C. Thereafter, it was cut out into the shape of a disk 16 mm in diameter, to produce the molded cathode.

Using the thus produced molded cathode, the lithium cell was fabricated in the same manner as the lithium cell C in EXAMPLE 36.

When the characteristics of the thus fabricated lithium cell were evaluated in the same manner as in EXAMPLE 36, there was observed no decrease in discharge capacity associated with charge/discharge cycles; further, the internal impedance of the lithium cell fabricated using the structural member obtained in the present example was 480Ω, which was lower than the internal impedance of the lithium cell C likewise fabricated using the molded cathode in EXAMPLE 36. It was also found that the discharge capacity was 14 mAh which was larger than the lithium cell C.

As described above, it has been found that according to the present invention, a lithium cell having superior cell characteristics can be obtained by improving the formability of the electrode and inserting a structural member in the electrode, without significantly impairing the internal ion conductivity of the cell.

EXAMPLE 42

In this example, there is explained an example in which an electroluminescent display device was fabricated as an all-solid electrochemical device by using the proton conducting solid electrolyte obtained in EXAMPLE 13.

Figure 9:
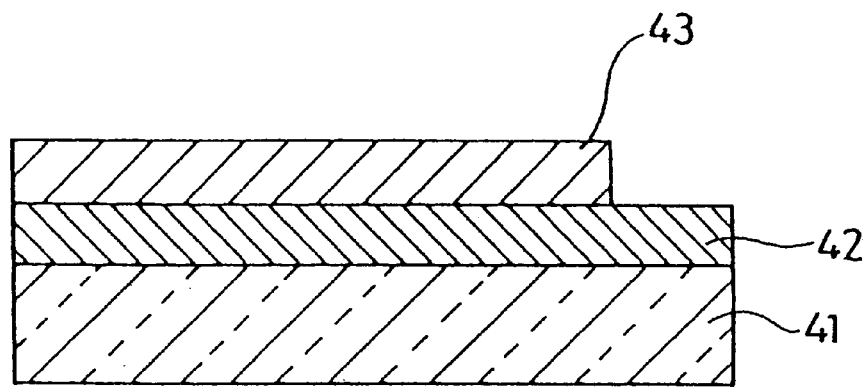
FIG. 9 is a vertical cross sectional view of a display electrode of an electroluminescent display device according to a further example of the present invention.

A thin film of tungsten oxide ($WO_3$) was used as a display electrode of the electroluminescent display device. As shown in FIG. 9, the tungsten oxide thin film 43 was formed by an electron beam deposition method on a glass substrate 41 on whose surface an ITO layer 42 had been formed as a transparent electrode by a sputtering deposition method.

A thin film of tungsten oxide ($H_xWO_3$) doped with proton, formed in the following manner, was used as the counter electrode.

First, in the same manner as the above display electrode, a tungsten oxide thin film was formed on a glass substrate 45 on whose surface an ITO electrode 46 had been formed. This glass substrate was immersed In an aqueous solution of chloroplatinic acid ($H_2PtCl_6$), and then dried in a hydrogen stream, to reduce the tungsten oxide to tungsten bronze ($H_xWO_3$) 47.

The electrolyte layer of the electroluminescent display device was formed in the following manner.

First, a toluene solution of (H-1) was added to the phosphoric acid doped silica gel obtained in EXAMPLE 13. Further, since the electrolyte layer was also used as a reflector, 5% alumina powder by weight was added to the silica gel to color the electrolyte layer white. The resulting mixture was then kneaded until the mizture turned into a slurry, and using a doctor blade method, the slurry was applied to a thickness of 50 µm on the surface of the previously formed display electrode, thus forming the electrolyte layer.

Figure 10:
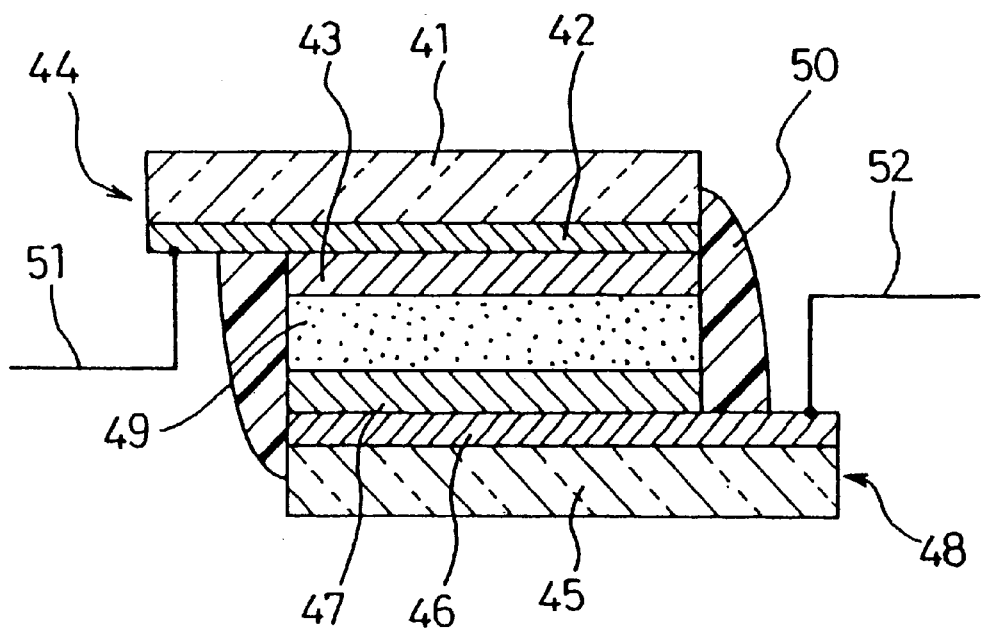
FIG. 10 is a vertical cross sectional view of the display device.

On the display electrode on whose surface the electrolyte layer was formed in the above manner, the earlier produced counter electrode was placed in such a manner as to cover the electrolyte layer, and the solvent was evaporated under a reduced pressure. The resulting cross section is shown in FIG. 10. Further, an ultraviolet curing resin 50 was applied to seal and adhere the end faces, thus completing the fabrication of the electroluminescent display device. In FIG. 10, numeral 44 designates the display electrode, 48 the counter electrode, 49 the electrolyte layer, and 51 and 52 are lead terminals.

The thus fabricated electroluminescent display device was subjected to an operation cycle test in which a voltage of −1 V was applied for two seconds to the display electrode relative to the counter electrode to color the display electrode, and then a voltage of +1 V was applied for two seconds to extinguish the color. The results after 10,000 cycles showed no performance degradation, retaining the ability to produce and extinguish color.

As described above, it has been found that an electroluminescent display device having excellent operation cycle characteristics can be obtained according to the present invention.

In the above EXAMPLES, there are explained the cases that lithium ion conductive amorphous solid electrolytes such as $0.6Li_2S$-$0.4SiS_2$, $0.01Li_3PO_4$-$0.63Li_2S$-$0.36SiS_2$, $0.5Li_2S$-$0.5P_2S_5$, and $0.6Li_2S$-$0.4B_2S_3$ were used for the lithium ion conductive inorganic solid electrolyte. However, it will be appreciated that similar effects can also be obtained by using the solid electrolytes with different composition ratios than those given above, electrolytes containing other sulfides such as $Li_2S$-$GeS_2$ not described in the EXAMPLES, electrolytes containing other lithium halides such as $LiCl$-$Li_2S$-$SiS_2$ and $LiBr$-$Li_2S$-$P_2S_5$, electrolytes of pseudoquaternary systems such as $LiI$-$Li_2S$-$SiS_2$-$P_2S_5$ and $LiI$-$Li_3PO_4$-$Li_2S$-$SiS_2$, or other crystalline lithium ion conductive inorganic solid electrolytes such as $Li_3N$, $Li_{1.3}Sc_{0.3}Ti_{1.7}(PO_4)_3$, and $Li_{0.2}La_{0.6}TiO_3$ not described in the EXAMPLES; thus, the lithium ion conductive solid electrolyte of the present invention is not limited to those described in the EXAMPLES.

Further, the EXAMPLES so far described have dealt with lithiated cobalt oxides, lithiated nickel oxides, lithiated manganese oxides, and graphite fluorides as examples of the substance that exhibits an electrochemical oxidation reduction reaction in a lithium ion conductive electrolyte; however, it will be appreciated that similar effects can also be obtained by using other substances, such as copper oxides and iron sulfides, that exhibit an electrochemical oxidation reduction reaction in a lithium ion conductive electrolyte, and the present invention is not limited to those described in the EXAMPLES as the substance that exhibits an electrochemical oxidation reduction reaction in a lithium ion conductive electrolyte.

In some EXAMPLES, lithium cells were described that used as the lithium ion conductive electrolyte an electrolyte comprising LiPF6 or LiClO$_4$ dissolved in a solvent mixture of propylene carbonate and dimethoxy ethane; however, it will be appreciated that similar effects can also be obtained by using an electrolyte that uses other supporting salts such as LiBF$_4$ not described in the EXAMPLES or an electrolyte that uses other solvents such as ethylene carbonate not described in the EXAMPLES, and the present invention is not limited to the lithium cells that use the electrolytes described in these EXAMPLES.

Further, in the EXAMPLES, the electronically insulating structural member has only been described as comprising a polyethylene mesh or a glass fiber mesh; however, it will be appreciated that similar effects can also be obtained by using meshes of other materials such as polypropylene, polyester, or cellulose, or even by using non-woven fabrics of such materials instead of meshes, and the electronically insulating structural member of the present invention is not limited to the polyethylene mesh or the glass fiber mesh.

Likewise, in the EXAMPLES, the electron conductive structural member has only been described as comprising a stainless steel mesh; however, it will be appreciated that similar effects can also be obtained by using meshes of other materials such as titanium, or even by using non-woven fabrics of such materials instead of meshes, and the structural member of the present invention is not limited to those described in the EXAMPLES.

Industrial Applicability

As described above, according to the present invention, a molded solid electrolyte having a high ionic conductivity as well as high formability or a molded electrode having high electrode activity can be obtained; furthermore, by using the molded solid electrolyte or the molded electrode, an electrochemical device exhibiting excellent operating characteristics can be obtained.

What is claimed is:

1. A molded solid electrolyte comprising a solid electrolyte and a hydrogenated block copolymer obtained by hydrogenating a straight chain or branched block copolymer; the straight chain or branched block copolymer containing, a block (A) comprising polybutadiene of which 1,2-vinyl bond content is 15% or less and a block (B) comprising a butadiene (copolymer consisting of 50 to 100% by weight of butadiene and 0 to 50% by weight of other monomers in which 1,2-vinyl bond content of butadiene portion is 20 to 90%, wherein (A)/(B)=5 to 70/95 to 30% by weight.

2. The molded solid electrolyte in accordance with claim 1, wherein the solid electrolyte is a lithium ion conductive solid electrolyte.

3. The molded solid electrolyte in accordance with claim 1, wherein the solid electrolyte is an amorphous solid electrolyte.

4. The molded solid electrolyte in accordance with claim 3, wherein the amorphous solid electrolyte is a lithium ion conductive solid electrolyte.

5. The molded solid electrolyte in accordance with claim 4, wherein the lithium ion conductive amorphous solid electrolyte consists essentially of a sulfide.

6. The molded solid electrolyte in accordance with claim 5, wherein the lithium ion conductive amorphous solid electrolyte contains silicon.

7. The molded solid electrolyte in accordance with claim 1, which includs an electronically insulating structural member.

8. A molded electrode consisting essentially of an electrode active material and a hydrogenated block copolymer obtained by hydrogenating a straight chain or branched block copolymer; the straight chain or branched block copolymer containing a block (A) comprising polybutadiene whose 1,2-vinyl bond content is 15% or less and a block (B) comprising a butadiene (co)polymer consisting of 50 to 100% by weight of butadiene and 0 to 50% by weight of other monomers in which 1,2-vinyl bond content of butadiene portion is 20 to 90%. wherein (A)/(B)=5 to 70/95 to 30% by weight.

9. The molded electrode in accordance with claim 8, which contains a lithium ion conductive solid electrolyte.

10. The molded electrode in accordance with claim 9, wherein the lithium ion conductive solid electrolyte is an amorphous solid electrolyte consisting essentially of a sulfide.

11. The molded electrode in accordance with claim 8, which contains a structural member.

12. The molded electrode in accordance with claim 11, wherein the structural member is an electronically insulating structural member.

13. An electrochemical device comprising a pair of electrodes and an electrolyte layer, wherein at least either the pair of electrodes or the electrolyte layer contains a hydrogenated block copolymer obtained by hydrogenating a straight chain or branched block copolymer containing a block (A) comprising polybutadiene whose 1,2-vinyl bond content is 15% or less and a block (B) comprising a butadiene (co)polymer consisting of 50 to 100% by weight of butadiene and 0 to 50% by weight of other monomers in which 1,2-vinyl bond content of butadiene portion is 20 to 90%, wherein (A)/(B)=5 to 70/95 to 30% by weight.

* * * * *